(12) United States Patent
Ji et al.

(10) Patent No.: US 12,724,431 B2
(45) Date of Patent: Sep. 1, 2026

(54) SYSTEM FOR FORMING PLATOONS TO TELEOPERATE A GROUP OF VEHICLES

(71) Applicant: TOYOTA MOTOR ENGINEERING & MANUFACTURING NORTH AMERICA, INC., Plano, TX (US)

(72) Inventors: Xunbi Ji, Mountain View, CA (US); Sergei S. Avedisov, Mountain View, CA (US); Taishi Sase, Mountain View, CA (US); Ahmadreza Moradipari, Mountain View, CA (US); Mohammad Irfan Khan, Mountain View, CA (US); Onur Altintas, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 18/990,065

(22) Filed: Dec. 20, 2024

(65) Prior Publication Data

US 2026/0178058 A1 Jun. 25, 2026

(51) Int. Cl.
*G05D 1/698* (2024.01)
*B60W 30/165* (2020.01)
(Continued)

(52) U.S. Cl.
CPC ......... *G05D 1/6985* (2024.01); *B60W 30/165* (2013.01); *G08G 1/22* (2013.01);
(Continued)

(58) Field of Classification Search
CPC ............. G05D 1/6985; G05D 2109/10; G05D 2111/10; G05D 2111/32; B60W 30/165;
(Continued)

(56) References Cited

U.S. PATENT DOCUMENTS 9,494,944 B2 * 11/2016 Alam ....................... G08G 1/16
10,248,116 B2 4/2019 Okumura
(Continued)

FOREIGN PATENT DOCUMENTS

KR 20210130334 A 11/2021
KR 102574666 B1 9/2023

OTHER PUBLICATIONS

Kakkavas et al., "Teleoperated Support for Remote Driving over 5G Mobile Communications," 2022 IEEE International Mediterranean Conference on Communications and Networking (MeditCom), Sep. 2022.

(Continued)

*Primary Examiner* — Rami Khatib
(74) *Attorney, Agent, or Firm* — SHEPPARD, MULLIN, RICHTER & HAMPTON LLP; Daniel N. Yannuzzi

(57) ABSTRACT

A plurality of vehicles traveling to a destination may be determined from platoon formation messages received from the plurality of vehicles. A subset of vehicles from the plurality of vehicles having a latency at or below a teleoperated driving (ToD) threshold may be determined from the platoon formation messages. A lead vehicle for a platoon may be determined from the subset of vehicles, where the lead vehicle includes a lowest latency of the subset of vehicles. A follow vehicle for the platoon may be determined from the subset of vehicles, where the follow vehicle includes a vehicular capability at or above a platoon formation threshold. The platoon between the lead and follow vehicles may be formed and upon forming the platoon, the video streaming of the follow vehicle may be deactivated. A platoon route for the platoon may be generated based on video data obtained by the lead vehicle.

20 Claims, 8 Drawing Sheets

(51) Int. Cl.

| | |
|---|---|
| ***G05D 109/10*** | (2024.01) |
| ***G05D 111/10*** | (2024.01) |
| ***G05D 111/30*** | (2024.01) |
| ***G08G 1/00*** | (2006.01) |
| ***H04W 4/46*** | (2018.01) |

(52) U.S. Cl.
CPC ........ *H04W 4/46* (2018.02); *B60W 2420/403* (2013.01); *B60W 2556/65* (2020.02); *G05D 2109/10* (2024.01); *G05D 2111/10* (2024.01); *G05D 2111/32* (2024.01)

(58) Field of Classification Search
CPC ........ B60W 2420/403; B60W 2556/65; G08G 1/22; H04W 4/46
See application file for complete search history.

(56) References Cited

U.S. PATENT DOCUMENTS

| | | | | |
|---|---|---|---|---|
| 11,669,108 | B2 | 6/2023 | Laws | |
| 11,916,736 | B2 | 2/2024 | Ucar | |
| 2020/0372795 | A1 * | 11/2020 | Szilagyi .................. | H04W 4/44 |
| 2022/0262257 | A1 | 8/2022 | Franchi | |
| 2022/0277653 | A1 * | 9/2022 | Lekutai ................... | H04W 4/80 |
| 2023/0222917 | A1 | 7/2023 | Masahiro | |
| 2024/0098226 | A1 | 3/2024 | Djukic | |
| 2024/0232319 | A9 * | 7/2024 | Smartt .................. | H04W 4/023 |
| 2024/0259142 | A1 * | 8/2024 | Narula .................. | H04L 1/1896 |
| 2025/0201128 | A1 * | 6/2025 | Katkoori ............... | B60W 10/04 |

OTHER PUBLICATIONS

Slamnik-Kriještorac et al., “Leveraging 5G to Enable Automated Barge Control: 5G-Blueprint Perspectives and Insights,” 20th Consumer Communications & Networking Conference (CCNC), Jan. 2023, 4 pages (https://doi.org/10.1109/CCNC51644.2023.10060113).

Ji et al., “Fundamental Rules of Teleoperated Driving with Network Latency on Curvy Roads,” 2024 IEEE Intelligent Vehicles Symposium (IV), pp. 1841-1846, Jun. 2024 (https://doi.org/10.1109/IV55156.2024.10588495).

5GAA, “C-V2X Use Cases and Service Level Requirements vol. II”, T-200116, 125 pages, Feb. 1, 2021 (https://5gaa.org/content/uploads/2021/01/5GAA_T-200116_TR_C- V2X_Use_Cases_and_Service_Level_Requirements_Vol_II_V2.1.pdf).

5GAA, “C-V2X Use Cases and Service Level Requirements vol. III,” Jan. 16, 2023, 22 pages (https://5gaa.org/content/uploads/2023/01/5gaa-tr-c-v2x-use-cases-and-service-level-requirements-vol-iii.pdf).

* cited by examiner 600
610
Remote operator
Vehicle Assemble Factory
630
632
634
Building
Dock for vehicle shipping 620

620
640
642
644

Computing Component 700

Hardware Processors 702 

Machine-Readable Storage Media 704

Determine a Plurality of Vehicles Traveling to a Destination from Platoon Formation Messages Received from the Plurality of Vehicles 706

Determine, from the Platoon Formation Messages, a Subset of Vehicles that have a Latency at or below a Teleoperated Driving (ToD) Threshold 708

Determine a Lead Vehicle with a Lowest Latency from the Subset of Vehicles 710

Determine a Follow Vehicle with a Vehicular Capability at or above a Platoon Following Threshold 712

Form a Platoon between the Lead Vehicle and the Follow Vehicle 714

Deactivate Video Streaming of the Follow Vehicle 716

Generate a Platoon Route for the Platoon based on Video Data obtained by the Lead Vehicle 718

FIG. 7

SYSTEM FOR FORMING PLATOONS TO TELEOPERATE A GROUP OF VEHICLES

TECHNICAL FIELD

The present disclosure relates generally to vehicles, and more particularly some aspects of the systems and methods disclosed herein relate to platoon formation for vehicles.

BACKGROUND OF THE INVENTION

Roadways serve numerous essential purposes that underpin the functioning of modern society. Roads are regularly used to facilitate the transportation of people and goods through vehicles, which may include automobiles, trucks, motorcycles, bicycles, scooters, mopeds, recreational vehicles and other like on- or off-road vehicles. Vehicles may further include autonomous, semi-autonomous and manual vehicles.

With numerous vehicles traveling on roads at any given time, it may be efficient for vehicles traveling in the same direction to travel together via platooning. Platoons of vehicles may be controlled and operated using autonomous driving. Current programs may also use teleoperated driving (ToD) as an alternative solution to autonomous driving when autonomous systems are inoperable. Platooning vehicles using ToD requires the transmittance of video stream between the vehicles in a platoon via communication networks to accurately guide the platoon of vehicles to a destination. The quality of the video stream and the latency experienced in the communication networks may significantly affect the performance of the ToD operation.

When multiple vehicles are traveling via platooning using ToD via the same communication network, a large amount of video streaming may be required to be transmitted between the vehicles in the platoon, causing congestion on the communication network. Congestion on the communication network may lead to packet loss on the video stream data, affecting the accuracy of information being delivered to the vehicles and lead to inaccurate and unsafe guidance of the platoon of vehicles through traffic. The overall ToD operation performance of the platoon of vehicles may degrade based on the severity of communication congestion. While there are numerous benefits to platooning using ToD, current programs have difficulty with implementing a high degree of performance of ToD operations for platoons of numerous vehicles.

BRIEF SUMMARY OF THE DISCLOSURE

According to various aspects of the disclosed technology, systems and methods for platoon formation are provided. In accordance with some implementations, a method for platoon formation of a plurality of vehicles is provided. The method may include: determining a plurality of vehicles traveling to a destination, the determination based on platoon formation messages received from the plurality of vehicles; determine, from the platoon formation messages, a subset of vehicles from the plurality of vehicles that have a latency capability at or below a teleoperated driving (ToD) threshold; determining from the subset of vehicles a lead vehicle for a platoon, wherein the lead vehicle comprises a latency capability with a lowest latency of the subset of vehicles; determining from the subset of vehicles a follow vehicle for the platoon, wherein the follow vehicle comprises a vehicular capability at or above a platoon following threshold for the vehicular capability; forming the platoon between the lead vehicle and the follow vehicle; upon forming the platoon, deactivating video streaming of the follow vehicle; and generating a platoon route for the platoon based on video data obtained by the lead vehicle.

In some applications, a platoon formation message of a vehicle includes the latency capability and the vehicular capability of the vehicle.

In some applications, the vehicular capability includes at least one of longitudinal stability, lateral stability, lateral deviation, communication, and driving performance of the follow vehicle.

In some applications, the ToD threshold is based on an overall latency permitted for the platoon.

In some applications, the platoon following threshold is based on at least one of the lead vehicle, follow vehicle, destination, road traveled on by the lead vehicle and the follow vehicle, time of day, day of week, traffic, road conditions, and environmental conditions.

In some applications, forming the platoon includes one or more instructions for each vehicle in the platoon to execute to form the platoon.

In some applications, forming the platoon includes linking a communication channel of the lead vehicle to a communication channel of the follow vehicle.

In some applications, the method may further include disassembling the platoon of vehicles by: disconnecting communication channels of the lead vehicle from communication channels of the follow vehicle and reactivating video streaming of the follow vehicle.

In some applications, the platoon route includes a route for the platoon of vehicles to follow to reach the destination.

In some applications, the platoon route is sent to each vehicle in the platoon.

In some applications, generating the platoon route is further based on the vehicular capability of each vehicle in the platoon.

In another aspect, a system for platoon formation is provided that may include one or more processors; and memory coupled to the one or more processors to store instructions, which when executed by the one or more processors, may cause the one or more processors to perform operations. The operations may include: determining a plurality of vehicles traveling to a destination, the determination based on platoon formation messages received from the plurality of vehicles; determine, from the platoon formation messages, a subset of vehicles from the plurality of vehicles that have a latency capability at or below a teleoperated driving (ToD) threshold; determining from the subset of vehicles a lead vehicle for a platoon, wherein the lead vehicle comprises a latency capability with a lowest latency of the subset of vehicles; determining from the subset of vehicles a follow vehicle for the platoon, wherein the follow vehicle comprises a vehicular capability at or above a platoon following threshold for the vehicular capability; forming the platoon between the lead vehicle and the follow vehicle; upon forming the platoon, deactivating video streaming of the follow vehicle; and generating a platoon route for the platoon based on video data obtained by the lead vehicle.

In some applications, a platoon formation message of a vehicle includes the latency capability and the vehicle capability of the vehicle.

In some applications, the vehicular capability includes at least one of longitudinal stability, lateral stability, lateral deviation, communication, and driving performance of the follow vehicle.

In some applications, the ToD threshold is based on an overall latency permitted for the platoon.

In some applications, the platoon following threshold is based on at least one of the lead vehicle, follow vehicle, destination, road traveled on by the lead vehicle and the follow vehicle, time of day, day of week, traffic, road conditions, and environmental conditions.

In some applications, forming the platoon includes one or more instructions for each vehicle in the platoon to execute to form the platoon.

In some applications, forming the platoon includes linking a communication channel of the lead vehicle to a communication channel of the follow vehicle.

In some applications, the system may further include operations comprising disassembling the platoon of vehicles by: disconnecting communication channels of the lead vehicle from communication channels of the follow vehicle and reactivating video streaming of the follow vehicle.

In some applications, the platoon route includes a route for the platoon of vehicles to follow to reach the destination.

In some applications, the platoon route is sent to each vehicle in the platoon.

In some applications, generating the platoon route is further based on the vehicular capability of each vehicle in the platoon.

In another aspect, a non-transitory machine-readable medium is provided. The non-transitory computer-readable medium may include instructions that when executed by a processor may cause the processor to perform operations including: determining a plurality of vehicles traveling to a destination, the determination based on platoon formation messages received from the plurality of vehicles; determine, from the platoon formation messages, a subset of vehicles from the plurality of vehicles that have a latency capability at or below a teleoperated driving (ToD) threshold; determining from the subset of vehicles a lead vehicle for a platoon, wherein the lead vehicle comprises a latency capability with a lowest latency of the subset of vehicles; determining from the subset of vehicles a follow vehicle for the platoon, wherein the follow vehicle comprises a vehicular capability at or above a platoon following threshold for the vehicular capability; forming the platoon between the lead vehicle and the follow vehicle; upon forming the platoon, deactivating video streaming of the follow vehicle; and generating a platoon route for the platoon based on video data obtained by the lead vehicle.

In some applications, a platoon formation message of a vehicle includes the latency capability and the vehicular capability of the vehicle.

In some applications, the vehicular capability includes at least one of longitudinal stability, lateral stability, lateral deviation, communication, and driving performance of the follow vehicle.

In some applications, the ToD threshold is based on an overall latency permitted for the platoon.

In some applications, the platoon following threshold is based on at least one of the lead vehicle, follow vehicle, destination, road traveled on by the lead vehicle and the follow vehicle, time of day, day of week, traffic, road conditions, and environmental conditions.

In some applications, forming the platoon includes one or more instructions for each vehicle in the platoon to execute to form the platoon.

In some applications, forming the platoon includes linking a communication channel of the lead vehicle to a communication channel of the follow vehicle.

In some applications, the non-transitory machine-readable medium may further include operations comprising disassembling the platoon of vehicles by: disconnecting communication channels of the lead vehicle from communication channels of the follow vehicle and reactivating video streaming of the follow vehicle.

In some applications, the platoon route includes a route for the platoon of vehicles to follow to reach the destination.

In some applications, the platoon route is sent to each vehicle in the platoon.

In some applications, generating the platoon route is further based on the vehicular capability of each vehicle in the platoon.

Other features and aspects of the disclosed technology will become apparent from the following detailed description, taken in conjunction with the accompanying drawings, which illustrate, by way of example, the features in accordance with applications of the disclosed technology. The summary is not intended to limit the scope of any inventions described herein, which are defined solely by the claims attached hereto.

BRIEF DESCRIPTION OF THE DRAWINGS

The present disclosure, in accordance with one or more various applications, is described in detail with reference to the following figures. The figures are provided for purposes of illustration only and merely depict typical or example applications.

FIG. 7 illustrates an example computing component that includes one or more hardware processors and machine-readable storage media storing a set of machine-readable/machine-executable instructions that, when executed, cause the one or more hardware processors to perform an illustrative method for platoon formation, according to example embodiments described in the present disclosure.

Figure 1:
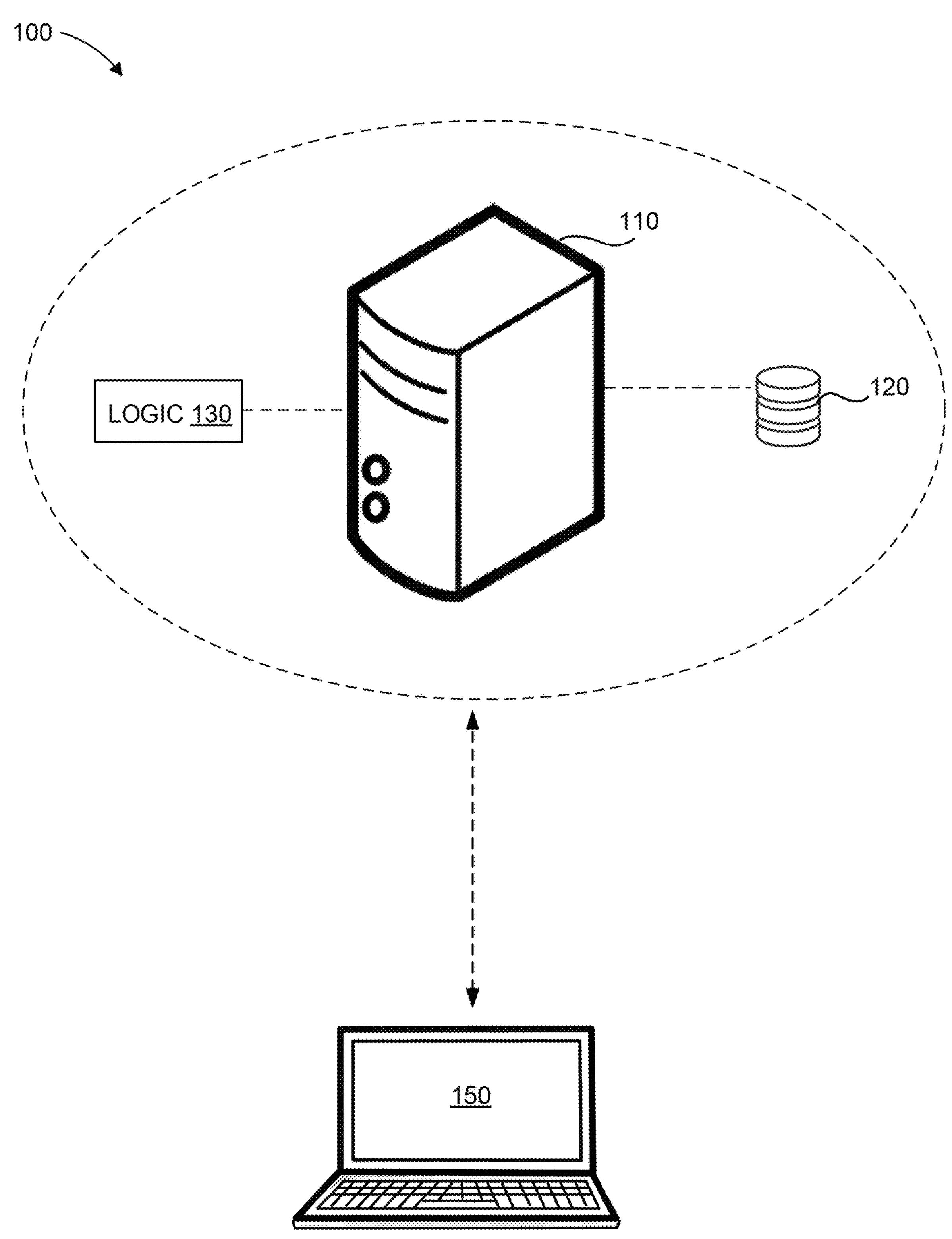
FIG. 1 illustrates an example computing system for platoon formation, according to example applications described in the present disclosure.

The figures are not exhaustive and do not limit the present disclosure to the precise form disclosed.

DETAILED DESCRIPTION

As described above, roads may be used as a means of facilitating vehicular transportation for personal, commercial, industrial, governmental, and other purposes. Vehicles may include automobiles, trucks, motorcycles, bicycles, scooters, mopeds, recreational vehicles and other like on- or off-road vehicles. Vehicles may further include autonomous, semi-autonomous and manual vehicles. Roads may include public and private infrastructure elements on which vehicles may travel, such as streets, arteries, highways, alleyways, easements, parking lots, and other. Roads may also include a high occupancy lane(s), i.e., a lane that requires a minimum number of persons present in a vehicle for its use and/or a lane that requires payment for its use.

Aspects of the technology disclosed herein may provide systems and methods configured establish and operate a platoon of vehicles. More particularly, some aspects of the technology may provide systems and methods for platoon formation of vehicles traveling in a same direction. This may include, for example, determining a plurality of vehicles traveling to a destination, the determination based on platoon formation messages received from the plurality of vehicles; determining, from the platoon formation messages, a subset of vehicles from the plurality of vehicles that have a latency capability at or below a teleoperated driving (ToD) threshold; determining from the subset of vehicles a lead vehicle for a platoon, wherein the lead vehicle comprises a latency capability with a lowest latency of the subset of vehicles; determining from the subset of vehicles a follow vehicle for the platoon, wherein the follow vehicle comprises a vehicular capability at or above a platoon following threshold for the vehicular capability; forming the platoon between the lead vehicle and the follow vehicle; upon forming the platoon, deactivating video streaming of the follow vehicle; and generating a platoon route for the platoon based on video data obtained by the lead vehicle. This may present an improvement over conventional technology that have difficulty with implementing a high degree of performance of ToD operations for platoons of numerous vehicles. The presented systems and methods for platoon formation may also present improvements over conventional technology in providing platooning operations during failures and issues with autonomous driving systems. With modern highways and high speed roads including large amounts of vehicles, accurately and efficiently implementing ToD operations may improve the benefits, accuracy and efficiency in platooning.

An ego vehicle may be traveling on a road. The ego vehicle may collect sensor data of the road upon which the ego vehicle is traveling. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation.

The ego vehicle may include one or more sensors that may be used to collect sensor data and map data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received from at least one sensor of the ego vehicle. The sensor data may include information on the condition of the road, damages to the road, hazardous features on the road, attributes of the road (i.e., the color, size, type and shape of lane markers, number of lanes, etc.), types of lanes (i.e., high occupancy lanes, merging lanes, exiting lanes, passing lanes, slow lanes, turning lanes, etc.), environmental conditions, lane markers and markings within the lane, map, location, traffic, speed, direction, and objects on, proximate to, and associated with the road that is collected by the ego vehicle. An object on the road may include a pothole, crack, tire marking, faded road marking, debris, occlusion, road reflection, flooding, ice, fire, oil leak, uneven pavement, erosion, raveling, sign, pole, building, coordinates, population, landscape, landmark, terrain, territory, weather, temperature, humidity, pollution, habitat, and other environmental surroundings on, proximate to, or associated with the road that the ego vehicle is traveling on.

The ego vehicle may collect map data of the road that the ego vehicle is traveling on. The map data, which may be stored onboard the vehicle or obtained from the cloud or other infrastructure element, may include location, coordinates, population, landscape, landmark, terrain, territory, weather, temperature, humidity, pollution, habitat, and other environmental surroundings on, proximate to, and associated with the road that the ego vehicle is traveling on. The map data, sensor data or both may be analyzed to determine a position of the ego vehicle on the road.

The ego vehicle may generate and send a platoon formation message to a platoon formation system. The platoon formation message may be a message presenting the ego vehicle's intention to seek to join a platoon of vehicles. The platoon formation message of the ego vehicle may include a location of the ego vehicle (i.e., information associated with the precise position of the ego vehicle on the road it is traversing on), destination of the ego vehicle (i.e., information associated with the precise position of the destination that the ego vehicle is traveling to reach), driving preference of the ego vehicle (i.e., information associated with the preference of the driver of the ego vehicle, including, for example, an average speed of travel, maximum speed of travel, maximum number of vehicles in a platoon, etc.), and one or more vehicular capabilities of the ego vehicles (i.e., latency, longitudinal stability, lateral deviation, communication, driving performance, etc.). The ego vehicle may use one or more sensors to determine its location, destination, driving preference, and vehicular capabilities. The ego vehicle may use one or more forms of communication to send the platoon formation message to the platoon formation system.

The platoon formation system may receive platoon formation messages from numerous vehicles. The platoon formation system may analyze the received platoon formation messages to determine a plurality of vehicles that are in a same location or locations in close proximity of each other. The location of the ego vehicle may include information associated with the precise position of the ego vehicle on the road it is traversing on. The location of the ego vehicle may be determined according to a GPS of the ego vehicle. The platoon formation system may identify such one or more vehicles at one or more locations at or below a distance threshold of each other by analyzing the platoon formation message of each of the one or more vehicles. The distance threshold may be a maximum distance between a set location, such as the location of the ego vehicle, and the location of another vehicle. The distance threshold may be a preset value. The distance threshold may vary according to one or more factors, including, for example, time of day, day of week, set location, type of road, traffic on the road, road conditions, environmental conditions, etc. The distance threshold may vary according to conditions and features of the road as determined from sensor data of one or more vehicles, including, for example, the ego vehicle. The distance threshold may be updated according to algorithms and models using driving data of vehicles. Many variations are possible.

The platoon formation system may determine a plurality of vehicles in the same location or close proximity of each other that are traveling to a same destination or destinations in close proximity of each other. The destination of the ego vehicle may include information associated with the precise position of the destination that the ego vehicle is traveling to reach as its final destination. The destination of the ego vehicle may be determined according to a GPS of the ego vehicle. The platoon formation system may determine which vehicles of the plurality of vehicles has a destination of travel that is at or below a destination threshold of a set destination, such as, for example, the destination of the ego vehicle. The destination threshold may be a maximum distance between the set destination and the destination of another vehicle. The destination threshold may be a maximum distance between the set destination and the route of travel of the another vehicle to the destination of the another vehicle, and vice versa. Many variations are possible. The destination threshold may be a preset value. The destination threshold may vary according to one or more factors, including, for example, time of day, day of week, set destination, type of road being traveled on, route of travel, traffic on the road, road conditions, environmental conditions, etc. The destination threshold may vary according to conditions and features of the road as determined from sensor data of one or more vehicles, including, for example, the ego vehicle. The destination threshold may be updated according to algorithms and models using driving data of vehicles. Many variations are possible. The platoon formation system may group these plurality of vehicles together to potentially form one or more platoons of vehicles.

Upon determining a plurality of vehicles that are in the same location (or location in close proximity of each other) and that are traveling to a same destination (or destinations in close proximity of each other), the platoon formation system may further analyze the platoon formation messages from the plurality of vehicles to determine the latency vehicular capability of each of the plurality of vehicles. Each platoon formation message of the plurality of vehicles may include a latency vehicular capability of a respective vehicle that represents the amount of time needed for data to pass from the respective vehicle to a communication network.

The platoon formation system may determine which of the plurality of vehicles has a latency vehicular capability that is at or below a teleoperated driving (ToD) threshold. The ToD threshold may be an overall latency allowed for a platoon of vehicles. The ToD threshold may be set according to a communication network being used by the platoon formation system to communicate to each vehicle in a platoon. The ToD threshold may be set according to one or more communication channels available for use in a communication network used by the platoon formation system to communicate to each vehicle in a platoon. The ToD threshold may be a preset value. The ToD threshold may vary according to one or more factors, including, for example, time of day, day of week, location of the plurality of vehicles, bandwidth of the communication network, network traffic, number of devices on the communication network, network latency, environmental conditions, etc. The ToD threshold may be updated according to algorithms and models using data on communication networks and channels for vehicle communication. Many variations are possible. Any and all of the plurality of vehicles that have a latency vehicular capability that is at or below a ToD threshold may be grouped in a subset.

The platoon formation system may determine a subset of vehicles from the plurality of vehicles that have a latency vehicular capability that is at or below the ToD threshold. Each vehicle in the subset may have its own value of latency vehicular capability. The platoon formation system may determine which vehicle in the subset has a lowest value of latency vehicular capability. The platoon formation system may label the vehicle with the lowest value of latency vehicular capability as a lead vehicle for a platoon.

The platoon formation system may determine, from the subset of vehicles that have a latency vehicular capability that is at or below the ToD threshold, one or more follow vehicles to join the platoon with the chosen lead vehicle. A vehicle from the subset of vehicles may be labeled as a follow vehicle when it includes a one or more vehicular capabilities that collectively meet requirements for a follow vehicle in a platoon. The one or more vehicular capabilities of a vehicle that are considered to determine whether such vehicle can be labeled as a follow vehicle include longitudinal stability, lateral stability, lateral deviation, communication, and driving performance (i.e., capabilities of the vehicle that affect its ability to be driven, including steering, braking, acceleration, deceleration, throttle, etc.).

The requirements for a follow vehicle may be set as a platoon following threshold that a vehicle may have to meet to be able to join a platoon as a following vehicle. The platoon following threshold may be a preset value. The platoon following threshold may vary according to one or more factors, including, for example, time of day, day of week, location of the plurality of vehicles, destination of travel, lead vehicle, type of road being traveled on, route of travel, traffic on the road, road conditions, environmental conditions, etc. The platoon following threshold may be updated according to algorithms and models using data on platooning. Many variations are possible. The platoon formation system may label one or more vehicles in the subset as a follow vehicle for the platoon with the lead vehicle.

After determining the lead vehicle and the one or more follow vehicles for a platoon, the platoon formation system may have the lead vehicle and the one or more follow vehicles form the platoon. To establish a platoon between the lead vehicle and one or more follow vehicles, the platoon formation system may generate a platoon formation strategy. The platoon formation strategy may include instructions for each vehicle to execute to establish a platoon. The platoon formation system may send the platoon formation strategy to each vehicle involved in forming a platoon. Each vehicle determined to form a platoon may execute instructions from the platoon formation strategy to establish the platoon. Each vehicle may have its own set of instructions to execute to efficiently and effectively form the platoon.

Each vehicle may be assigned a particular position in the platoon, such as, for example, a lead position, following position, middle position, end position, first position, second position, third position, etc. The position assigned to the lead vehicle may be the first, lead position in the platoon. The position assigned to each of the follow vehicles may be assigned at random by the platoon formation system. The position assigned to each follow vehicle may be based on one or more factors, including, for example, driving preference of each follow vehicle, location of each follow vehicle, destination of each follow vehicle, vehicular capabilities of each follow vehicle, traffic, route of travel, environmental conditions, etc. The driving preference of a vehicle may include information associated with the preference of the driver of the vehicle, including, for example, an average speed of travel, maximum speed of travel, position in a platoon that the driver of the vehicle is comfortable with being at, etc.

Upon forming the platoon between the lead vehicle and the one or more follow vehicles, the platoon formation system may link one or more communication channels of each of the lead and follow vehicles. By linking one or more communication channels of the lead and follow vehicles, each vehicle in the platoon may be able to communicate with one another. Each of the lead and follow vehicles in the platoon may be able to send messages and data to one another using the linked communication channel(s). Each vehicle may have its own sensor data. The sensor data of each vehicle may include a direction, speed, driving pattern, location, road condition, map, location, traffic, object, and environmental condition that the respective vehicle encounters while traveling on the road. Each vehicle in the platoon may have one or more sensors capable of collecting data of the road and the driving performance of the respective vehicle. One or more sensors, either individually or in combination, may be able to collect data on the road, such as sensor data, to determine conditions and features of the road. The one or more sensors, either individually or in combination, may be able to collect data on the driving performance of the respective vehicle to determine the driving pattern of the respective vehicle on the road. The one or more sensors of the vehicle used to collect data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

Upon forming the platoon with the lead and one or more follow vehicles, the platoon formation system may deactivate one or more sensors of each follow vehicle. By deactivating the one or more sensors of each follow vehicle, each follow vehicle may be unable to collect data relative to the road, vehicles, traffic, environment, and driving performance of the respective vehicle. The platoon formation system may deactivate the one or more sensors of each follow vehicle to limit the use of the one or more sensors, such as deactivating (or restricting) the video streaming capabilities of the one or more follow vehicles. Deactivating the video streaming capabilities of a vehicle may prevent the vehicle from collecting and transmitting video data that the vehicle may be able to obtain using one or more sensors. By deactivating one or more sensors and data collecting capabilities of a follow vehicle in a platoon, the platoon formation system may be able to reduce the amount of bandwidth being used in a communication network, which may reduce the amount of latency needed for vehicles in a platoon to communicate to each other to navigate and travel via platooning. Reducing the amount of bandwidth and latency that may be necessary for a platoon of vehicles to communicate between may improve the accuracy and efficiency in platooning vehicles.

While the platoon formation system may deactivate one or more sensors and data collecting capabilities of the one or more follow vehicles, the platoon formation system may allow the lead vehicle to have all of its sensors active and collect data relative to all aspects of the road, vehicles, traffic, environment, and driving performance of the lead vehicle and each of the follow vehicles. The platoon formation system may use the data collected by the one or more sensors of the lead vehicle to generate a platoon route for the platoon. The data collected by the lead vehicle may include video streaming data that is collected using one or more sensors that visually display information relative to the road, surrounding vehicles, traffic, environment, and driving performance of the lead vehicle and each of the follow vehicles.

The platoon formation system may generate the platoon route to include a route for each vehicle in the platoon to follow to reach at least one destination of the vehicles in the platoon. The platoon route may be generated according to one or more factors, including, for example, time of day, day of week, destination of one or more vehicles in the platoon, type of road the platoon of vehicles is traveling on, traffic on the road, road conditions, environmental conditions, safety, energy efficiency, road capacity, comfort, vehicular capabilities of one or more vehicles in the platoon, etc. The safety factor may be associated with a minimum amount of safety conditions that the vehicles in a platoon may have to follow when traveling as a platoon, including, for example, a minimum distance of space between each vehicle in the platoon based on the speed of the platoon, maximum speed of travel allowed by each vehicle in the platoon, minimum distance of space between the lead vehicle of the platoon and the vehicle in front of the platoon, etc. The energy efficiency factor may be associated with an amount of energy that each vehicle in the platoon may need to conserve when traveling in the platoon. The road capacity factor may be associated with a number of vehicles on the road and near the location of the platoon of vehicles. The comfort factor may be associated with at least one of driving preferences of each driver of each vehicle in the platoon, capabilities of each vehicle in the platoon, road conditions, environmental conditions, traffic, etc. Each factor considered in generating the platoon route may be based on capabilities of each vehicle in the platoon, the location of the platoon of vehicles, characteristics of the road, environmental conditions, etc. The platoon formation system may update the platoon route according to changes in the one or more factors. The platoon formation system may send the platoon route to each vehicle in the platoon.

After a platoon of vehicles is formed, the platoon of vehicles may travel on the road according to the platoon route generated by the platoon formation system using data obtained by the lead vehicle. As the platoon of vehicles is traveling to a destination, the platoon formation system may determine if the data obtained by the lead vehicle is adequate to accurately and efficiently generate a platoon route for the platoon of vehicles to follow. Upon a determination that the data obtained by the lead vehicle is insufficient, the platoon formation system may reactivate one or more sensors of one or more follow vehicles to collect additional data relative to the road, vehicles, traffic, environment, and driving performance of the lead vehicle and each of the follow vehicles. The platoon formation system may collectively use the data obtained by the lead vehicle and the data obtained by the one or more follow vehicles to generate the platoon route for the platoon of vehicles to follow. The platoon formation system may choose which one or more sensors of which one or more follow vehicles to activate according to the availability of resources in the communication network. The platoon formation system may monitor the amount of data being collected by the lead vehicle and one or more follow vehicles to deactivate sensors accordingly to prevent the amount of data being transmitted from exceeding an overload limit. By keeping the amount of data being transmitted within an overload limit, the platoon formation system may decrease the amount of congestion on the communication network used by the platoon of vehicles while increasing the accuracy and efficiency in platooning vehicles. Many variations are possible.

A vehicle in a platoon may disengage from the platoon for a variety of reasons, including, for example, when the vehicle reaches a point in the platoon route where it needs to disengage and separate itself to reach its respective destination, when the vehicle has to make a stop (e.g., to refill gas, recharge vehicle battery, purchase food, use restroom, take rest stop, fix vehicle, buy medicine, etc.), when the driver of the vehicle chooses to no longer be in the platoon, and when the platoon has reached its final destination. A vehicle in a platoon may disengage from the platoon by sending a platoon disengage message to the platoon formation system. The platoon formation system may disengage a vehicle from a platoon by sending instructions to the vehicle for disengaging from the platoon. The platoon formation system may disengage a vehicle from a platoon without first receiving a platoon disengage message, when the platoon formation system determines that the vehicle needs to be disengaged from the platoon based on the platoon formation message of the respective vehicle. Many variations are possible.

When a vehicle in a platoon is determined to be disengaged from the platoon, the platoon formation system may send instructions to the disengaging vehicle to disengage from the platoon formation. The platoon formation system may generate an updated platoon formation strategy for each remaining vehicle in the platoon and send the updated platoon formation strategy to each remaining vehicle. Each remaining vehicle may execute the updated platoon formation strategy to establish an updated platoon formation upon the separation of the disengaged vehicle. In one example, if the third vehicle in a four vehicle platoon is determined to disengage from the platoon, an updated platoon formation strategy may be provided to have the remaining vehicles establish an updated platoon formation where the fourth vehicle will now move closer to the second vehicle and take the place of the disengaged third vehicle. The updated platoon formation may now consist of only the remaining three vehicles. In another example, if the first vehicle in a four vehicle platoon is determined to disengage from the platoon, an updated platoon formation strategy may be provided to have the remaining vehicles establish an updated platoon formation where the follow vehicle with the lowest latency vehicular capability becomes the lead vehicle of the platoon and takes the place of the disengaged first vehicle. The updated platoon formation may now consist of only the remaining three vehicles. Once the remaining vehicles have established the updated platoon formation, the updated platoon may continue traveling on the road according to the platoon route provided by the platoon formation system.

When a vehicle in a platoon is determined to be disengaged from the platoon, the platoon formation system may disconnect the communication channel(s) of the respective vehicle from the other vehicles in the platoon. The platoon formation system may reactivate any of the one or more sensors of the disengaged vehicle that may have been previously deactivated. Upon reaching the final destination of the platoon, the platoon formation system may disassemble the platoon of vehicles. Disassembling the platoon of vehicles may include disconnecting the communication channels of each vehicle in the platoon. Disassembling the platoon of vehicles may include reactivating one or more sensors of one or more follow vehicles that may have been previously deactivated during platooning.

Each of the vehicles in a platoon may communicate to one another and to the platoon formation system using a P2P (peer-to-peer), V2V or other communication protocol. A platoon of vehicles may move together according to a navigation strategy (i.e., a platoon route) to travel efficiently, effectively, and safely navigate the platoon of vehicles on a road.

Monitoring data of various vehicles traveling on a road may permit up-to-date navigation information and road conditions, that may be analyzed to efficiently and accurately identify compatible vehicles for platoon formation and navigate a platoon of vehicles on a road. The efficient and accurate determination of compatible vehicles may improve the efficiency, effectiveness, and safety of forming platoons of vehicles and in the navigation of platoons of vehicles traveling on the road. Efficiently, effectively, and safely controlling platooning may further increase the avoidance of incidents and accidents occurring on the road.

It should be noted that the terms “accurate,” “accurately,” and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example of a computing system 100 which may be internal or otherwise associated within a device 150. In some embodiments, the computing system 100 may be a machine learning (ML) pipeline and model, and use ML algorithms. In some examples, the device 150 may be a computing device, such as a desktop computer, a laptop, a mobile phone, a tablet device, an Internet of Things (IoT) device, etc. In some examples, device 150 may include an autonomous, semi-autonomous or manual vehicle, with which applications of the disclosed technology may be implemented. In some examples, device 150 may include an automobile, truck, motorcycle, bicycle, scooter, moped, recreational vehicle and other like on- or off-road vehicles, that may include an autonomous, semi-autonomous and manual operation. The device 150 may input data into computing component 110. The computing component 110 may perform one or more available operations on the input data to generate outputs, such as identifying other vehicles to form a platoon and generating a platoon route to navigate the platoon to reach a destination. The device 150 may further display the outputs on a Graphical User Interface (GUI). The GUI may be on the device 150 and may display the outputs as a two-dimensional (2D) and three-dimensional (3D) layout and map showing the various outputs generated by algorithms, such as ML algorithms, based on various input data, such as vehicle location, travel destination, vehicular capabilities, driving preference, sensor data of road conditions, environmental conditions, lane markers, traffic, speed of vehicles, direction of vehicles, obstructions, and objects from vehicles and roads.

The computing system 110 in the illustrated example may include one or more processors and logic 130 that implements instructions to carry out the functions of the computing component 110, such as, for example, determining a plurality of vehicles traveling to a destination, the determination based on platoon formation messages received from the plurality of vehicles; determining, from the platoon formation messages, a subset of vehicles from the plurality of vehicles that have a latency capability at or below a teleoperated driving (ToD) threshold; determining from the subset of vehicles a lead vehicle for a platoon, wherein the lead vehicle comprises a latency capability with a lowest latency of the subset of vehicles; determining from the subset of vehicles a follow vehicle for the platoon, wherein the follow vehicle comprises a vehicular capability at or above a platoon following threshold for the vehicular capability; forming the platoon between the lead vehicle and the follow vehicle; upon forming the platoon, deactivating video streaming of the follow vehicle and linking communication channels of the lead vehicle to communication channels of the follow vehicle; and generating a platoon route for the platoon based on video data obtained by the lead vehicle. The computing component 110 may store, in a database 120, details regarding scenarios or conditions in which some algorithms, image datasets, and assessments are performed and used to identify vehicles to form platoons of vehicles and generate platoon routes to navigate the platoons of vehicles. Some of the scenarios or conditions will be illustrated in the subsequent figures.

A processor may include one or more GPUs, CPUs, microprocessors or any other suitable processing system. Each of the one or more processors may include one or more single core or multicore processors. The one or more processors may execute instructions stored in a non-transitory computer readable medium. Logic 130 may contain instructions (e.g., program logic) executable by the one or more processors to execute various functions of computing component 110. Logic 130 may contain additional instructions as well, including instructions to transmit data to, receive data from, and interact with device 150.

ML can refer to methods that, through the use of algorithms, are able to automatically extract intelligence or rules from training data sets and capture the same in informative models. In turn, those models are capable of making predictions based on patterns or inferences gleaned from subsequent data input into a trained model. According to implementations of the disclosed technology, the ML algorithm comprises, among other aspects, algorithms implementing a Gaussian process and the like. The ML algorithms disclosed herein may be supervised and/or unsupervised depending on the implementation. The ML algorithms may emulate the observed characteristics and components of roads, vehicles and drivers to better evaluate road conditions, evaluate driving patterns, and determine and identify lanes of a road to accurately navigate vehicles.

Although one example computing system 110 is illustrated in FIG. 1, in various embodiments multiple computing systems 110 can be included. Additionally, one or more systems and subsystems of computing system 100 can include its own dedicated or shared computing component 110, or a variant thereof. Accordingly, although computing system 100 is illustrated as a discrete computing system, this is for ease of illustration only, and computing system 100 can be distributed among various systems or components. The computing component 110 may be, for example, the computing system 210 of FIG. 2, the platoon formation system 300 of FIG. 3, the process 400 of FIG. 4, the platoon formation system 600 of FIGS. 6A-6C, the computing component 700 of FIG. 7 and the computing component 800 of FIG. 8.

Figure 2:
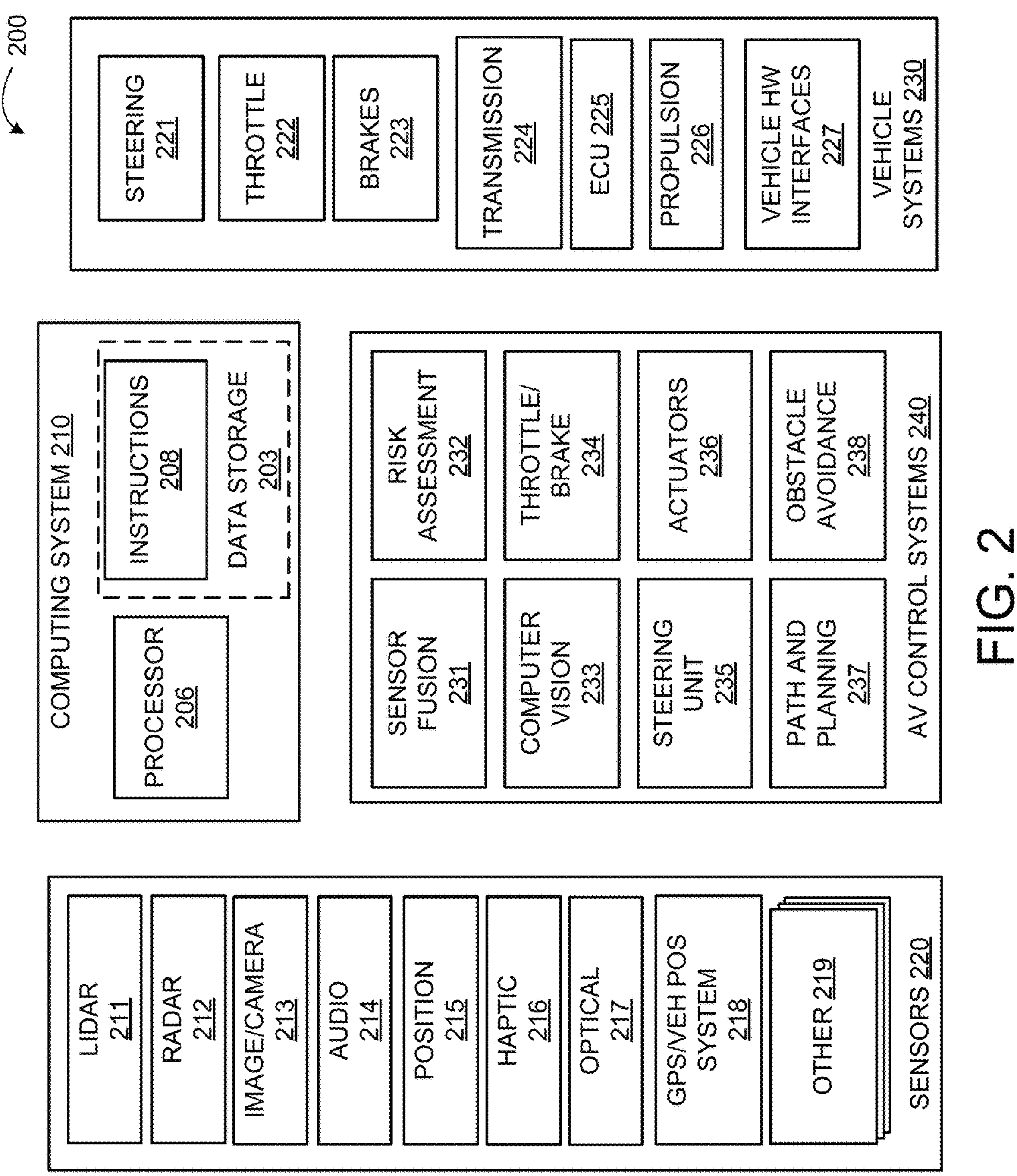
FIG. 2 illustrates an example vehicle with which applications of the disclosed technology may be implemented.

FIG. 2 illustrates an example connected vehicle 200, such as an autonomous, semi-autonomous or manual vehicle, with which applications of the disclosed technology may be implemented. As described herein, vehicle 200 can refer to a vehicle, such as an automobile, truck, motorcycle, bicycle, scooter, moped, recreational vehicle and other like on- or off-road vehicles, that may include an autonomous, semi-autonomous and manual operation. The vehicle 200 may include components, such as a computing system 210, sensors 220, vehicle systems 230, and AV control systems 240. Either of the computing system 210, sensors 220, vehicle systems 230, and AV control systems 240 can be part of an automated vehicle system/advanced driver assistance system (ADAS). ADAS can provide navigation control signals (e.g., control signals to actuate the vehicle and operate one or more vehicle systems 230 as shown in FIG. 2) for the vehicle to navigate a variety of situations. As used herein, ADAS can be an autonomous vehicle control system adapted for any level of vehicle control and driving autonomy. For example, the ADAS can be adapted for level 1, level 2, level 3, level 4, and level 5 autonomy (according to SAE standard). ADAS can allow for control mode blending (i.e., blending of autonomous and assisted control modes with human driver control). ADAS can correspond to a real-time machine perception system for vehicle actuation in a multi-vehicle environment. Vehicle 200 may include a greater or fewer quantity of systems and subsystems, and each could include multiple elements. Accordingly, one or more of the functions of the technology disclosed herein may be divided into additional functional or physical components, or combined into fewer functional or physical components. Additionally, although the systems and subsystems illustrated in FIG. 2 are shown as being partitioned in a particular way, the functions of vehicle 200 can be partitioned in other ways. For example, various vehicle systems and subsystems can be combined in different ways to share functionality.

Sensors 220 may include a plurality of different sensors to gather data regarding vehicle 200, its operator, its operation and its surrounding environment. Although various sensors are shown, it can be understood that systems and methods for platoon formation may not require many sensors. It can also be understood that system and methods described herein can be augmented by sensors off the vehicle 200. In this example, sensors 220 include light detection and ranging (LIDAR) sensor 211, radar sensor 212, image sensors 213 (i.e., a camera), audio sensors 214, position sensor 215, haptic sensor 216, optical sensor 217, a Global Positioning System (GPS) or other vehicle positioning system 218, and other like distance measurement and environment sensing sensors 219. One or more of the sensors 220 may gather data, such as road conditions data, and send that data to the vehicle ECU or other processing unit. Sensors 220 (and other vehicle components) may be duplicated for redundancy.

Distance measuring sensors such as LiDAR sensor 211, radar sensor 212, IR sensors and other like sensors can be used to gather data to measure distances and closing rates to various external objects such as other vehicles, roads, traffic signs, pedestrians, light poles and other objects. Image sensors 213 can include one or more cameras or other image sensors to capture images of the environment around the vehicle, such as road surfaces, as well as images internal to the vehicle. Information from image sensors 213 (e.g., camera) can be used to determine information about the environment surrounding the vehicle 200 including, for example, information regarding road surfaces and other objects surrounding vehicle 200. For example, image sensors 213 may be able to recognize specific vehicles (e.g. color, vehicle type), landmarks or other features (including, e.g., street signs, traffic lights, etc.), slope of the road, lines on the road, damages and other potentially hazardous conditions to the road, curbs, objects to be avoided (e.g., other vehicles, pedestrians, bicyclists, etc.) and other landmarks or features. Information from image sensors 213 can be used in conjunction with other information such as map data, or information from positioning system 218 to determine, refine, or verify vehicle (ego vehicle 200 or another vehicle) location as well as detect obstructions and identify lanes of a road.

Vehicle positioning system 218 (e.g., GPS or other positioning system) can be used to gather position information about a current location of the vehicle 200 as well as other positioning or navigation information, such as the positioning information about a current location and direction of movement of the vehicle 200 according to a particular road condition.

Other sensors 219 may be provided as well. Other sensors 219 can include vehicle acceleration sensors, vehicle speed sensors, wheelspin sensors (e.g., one for each wheel), a tire pressure monitoring sensor (e.g., one for each tire), vehicle clearance sensors, left-right and front-rear slip ratio sensors, and environmental sensors (e.g. to detect weather, traction conditions, or other environmental conditions). Other sensors 219 can be further included for a given implementation of ADAS. Various sensors 220, such as other sensors 219, may be used to provide input to computing system 210 and other systems of vehicle 200 so that the systems have information useful for platoon formation and navigation.

AV control systems 240 may include a plurality of different systems/subsystems to control operation of vehicle 200. In this example, AV control systems 240 can include, autonomous driving module (not shown), sensor fusion module 231, risk assessment module 232, computer vision module 233, throttle and brake control unit 234, steering unit 235, actuator(s) 236, path and planning module 237, and obstacle avoidance module 238. Sensor fusion module 231 can be included to evaluate data from a plurality of sensors, including sensors 220. Sensor fusion module 231 may use computing system 210 or its own computing system to execute algorithms to assess inputs from the various sensors.

Throttle and brake control unit 234 can be used to control actuation of throttle and braking mechanisms of the vehicle 200 to accelerate, slow down, stop or otherwise adjust the speed of the vehicle 200. For example, the throttle unit can control the operating speed of the engine or motor used to provide motive power for the vehicle 200. Likewise, the brake unit can be used to actuate brakes (e.g., disk, drum, etc.) or engage regenerative braking (e.g., such as in a hybrid or electric vehicle) to slow or stop the vehicle 200.

Steering unit 235 may include any of a number of different mechanisms to control or alter the heading of the vehicle 200. For example, steering unit 235 may include the appropriate control mechanisms to adjust the orientation of the front or rear wheels of the vehicle 200 to accomplish changes in direction of the vehicle 200 during operation. Electronic, hydraulic, mechanical or other steering mechanisms may be controlled by steering unit 235.

Computer vision module 233 may be included to process image data (e.g., image data captured from image sensors 213, or other image data) to evaluate the environment within or surrounding the vehicle 200. For example, algorithms operating as part of computer vision module 233 can evaluate still or moving images to determine features and landmarks (e.g., road pavements, lines of the road, damages and other potentially hazardous conditions on the road, road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 233 may be able to model a road traffic vehicle network, a communication network, predict incoming hazards and obstacles, predict road hazard, determine one or more contributing factors to identifying obstructions, and determine one or more factors for platoon formation and ToD operations. Computer vision module 233 may be able to perform depth estimation, image/video segmentation, camera localization, and object classification according to various classification techniques (including by applied neural networks).

Path and planning module 237 may be included to compute a desired path for vehicle 200 based on input from various other sensors and systems. For example, path and planning module 237 can use information from positioning system 218, sensor fusion module 231, computer vision module 233, obstacle avoidance module 238 (described below) and other systems (e.g., AV control systems 240, sensors 220, and vehicle systems 230) to determine a safe path to navigate the vehicle 200 along a segment of a desired route. Path and planning module 237 may also be configured to dynamically update the vehicle path as real-time information is received from sensors 220 and other control systems 240.

Obstacle avoidance module 238 can be included to determine control inputs necessary to avoid obstacles and obstructions detected by sensors 220 or AV control systems 240. Obstacle avoidance module 238 can work in conjunction with path and planning module 237 to determine an appropriate path to avoid and navigate around obstacles and obstructions.

Path and planning module 237 (either alone or in conjunction with one or more other module of AV Control system 240, such as obstacle avoidance module 238, computer vision module 233, and sensor fusion module 231) may also be configured to perform and coordinate one or more vehicle maneuvers. Example vehicle maneuvers can include at least one of a path tracking, stabilization and collision avoidance maneuver. With connected vehicles, such as vehicles selected for platoon formation, vehicle maneuvers can be performed at least partially cooperatively between the connected vehicles to gather a sufficient amount of data of the road to efficiently, effectively, and safely navigate a platoon of vehicles. A sufficient amount of data of a road may include collecting data of the characteristics of and obstructions on a road, at various angles and perspectives. Each different type of characteristic and obstruction may warrant a different amount of data to be collected and analyzed to make the needed determinations of the characteristic and obstruction. A sufficient amount of data of a road may further include environmental conditions, road conditions, lane markers, traffic, speed of vehicles, maneuvers of vehicles, and objects on or relating to a road. Hence, those of ordinary skill in the art will understand what sufficient means in the context of collecting a sufficient amount of data of a road.

Vehicle systems 230 may include a plurality of different systems/subsystems to control operation of vehicle 200. In this example, vehicle systems 230 include steering system 221, throttle system 222, brakes 223, transmission 224, electronic control unit (ECU) 225, propulsion system 226 and vehicle hardware interfaces 227. The vehicle systems 230 may be controlled by AV control systems 240 in autonomous, semi-autonomous or manual mode of vehicle 200. For example, in autonomous or semi-autonomous mode, AV control systems 240, alone or in conjunction with other systems, can control vehicle systems 230 to operate the vehicle 200 in a fully or semi-autonomous fashion. When control is assumed, computing system 210 and AV control system 240 can provide vehicle control systems to vehicle hardware interfaces for controlled systems such as steering angle 221, brakes 223, throttle 222, or other hardware interfaces 227, such as traction force, turn signals, horn, lights, etc. This may also include an assist mode in which the vehicle 200 takes over partial control or activates ADAS controls (e.g., AC control systems 240) to assist the driver with vehicle operation.

Computing system 210 in the illustrated example includes a processor 206, and memory 203. Some or all of the functions of vehicle 200 may be controlled by computing system 210. Processor 206 can include one or more GPUs, CPUs, microprocessors or any other suitable processing system. Processor 206 may include one or more single core or multicore processors. Processor 206 executes instructions 208 stored in a non-transitory computer readable medium, such as memory 203.

Memory 203 may contain instructions (e.g., program logic) executable by processor 206 to execute various functions of vehicle 200, including those of vehicle systems and subsystems. Memory 203 may contain additional instructions as well, including instructions to transmit data to, receive data from, interact with, and control one or more of the sensors 220, AV control systems 240 and vehicle systems 230. In addition to the instructions, memory 203 may store data and other information used by the vehicle 200 and its systems and subsystems for operation, including operation of vehicle 200 in the autonomous, semi-autonomous or manual modes. For example, memory 203 can include data that has been communicated to the ego vehicle (e.g. via V2V communication), mapping data, a model of the current or predicted road traffic vehicle network, vehicle dynamics data, computer vision recognition data, and other data which can be useful for the execution of one or more vehicle maneuvers, for example by one or more modules of the AV control systems 240.

Although one computing system 210 is illustrated in FIG. 2, in various applications multiple computing systems 210 can be included. Additionally, one or more systems and subsystems of vehicle 200 can include its own dedicated or shared computing system 210, or a variant thereof. Accordingly, although computing system 210 is illustrated as a discrete computing system, this is for ease of illustration only, and computing system 210 can be distributed among various vehicle systems or components.

Vehicle 200 may also include a (wireless or wired) communication system (not illustrated) to communicate with other vehicles, infrastructure elements, cloud components and other external entities using any of a number of communication protocols including, for example, V2V (vehicle-to-vehicle), V2I (vehicle-to-infrastructure) and V2X (vehicle-to-everything) protocols. Such a wireless communication system may allow vehicle 200 to receive information from other objects including, for example, map data, data regarding infrastructure elements, data regarding operation and intention of surrounding vehicles, and so on. A wireless communication system may allow vehicle 200 to receive updates to data that can be used to execute one or more vehicle control modes, and vehicle control algorithms as discussed herein. Wireless communication system may also allow vehicle 200 to transmit information to other objects, such as video streaming data and platoon route information, and receive information from other objects (such as other vehicles, user devices, or infrastructure). In some applications, one or more communication protocol or dictionaries can be used, such as the SAE J2935 V2X Communications Message Set Dictionary. In some applications, the communication system may be useful in retrieving and sending one or more data useful in platoon formation, as disclosed herein.

Communication system can be configured to receive data and other information from sensors 220 that is used in determining whether and to what extent control mode blending should be activated. Additionally, communication system can be used to send an activation signal or other activation information to various vehicle systems 230 and AV control systems 240 as part of controlling the vehicle 200. For example, communication system can be used to send signals to one or more of the vehicle actuators 236 to control parameters, for example, maximum steering angle, throttle response, vehicle braking, torque vectoring, and so on.

In some applications, computing functions for various applications disclosed herein may be performed entirely on computing system 210, distributed among two or more computing systems 210 of vehicle 200, performed on a cloud-based platform, performed on an edge-based platform, or performed on a combination of the foregoing.

Path and planning module 237 can allow for executing one or more vehicle control mode(s), and vehicle control algorithms in accordance with various implementations of the systems and methods disclosed herein.

In operation, path and planning module 237 (e.g., by a driver intent estimation module, not shown) can receive information regarding human control input used to operate the vehicle 200. As described above, information from sensors 220, actuators 236 and other systems can be used to determine the type and level of human control input. Path and planning module 237 can use this information to predict driver action. Path and planning module 237 can use this information to generate a predicted path and model a road traffic vehicle network. This may be useful in evaluating road conditions, and generating a platoon route to navigate a platoon of vehicles. As also described above, information from sensors, and other systems can be used to evaluate road conditions, evaluate driving patterns, and navigate a platoon of vehicles on a road. Eye state tracking, attention tracking, or intoxication level tracking, for example, can be used to determine vehicle movement patterns according to inherent human behavior. It can be understood that the driver state can contribute to platoon formation as disclosed herein. Driver state can be provided to a risk assessment module 232 to determine the level of risk associated with a vehicle operation, and with joining a platoon of vehicles. Although not illustrated in FIG. 2, where the assessed risk contributes to determining vehicle movement patterns according to inherent human behaviors, a platoon formation strategy may be generated and provided to vehicle 200 to form a platoon with other vehicles. Aspects of generating a platoon formation strategy to form a platoon with various vehicles will be disclosed with reference to subsequent figures.

Path and planning module 237 can receive state information such as, for example from visibility maps, traffic and weather information, hazard maps, and local map views. Information from a navigation system can also provide a mission plan including maps and routing to path and planning module 237.

The path and planning module 237 (e.g., by a driver intent estimation module, not shown) can receive this information and predict behavior characteristics within a future time horizon. This information can be used by path and planning module 237 for executing one or more planning decisions. Planning decisions can be based on one or more policy (such as defensive driving policy). Planning decisions can be based on one or more level of autonomy, connected vehicle actions, one or more policy (such as defensive driving policy, cooperative driving policy, such as swarm or platoon formation, leader following, etc.). Path and planning module 237 can generate an expected model for the road traffic hazards and assist in creating a predicted traffic hazard level and verification strategy for vehicles to execute.

Path and planning module 237 can receive risk information from risk assessment module 232. Path and planning module 237 can receive vehicle capability and capacity information from one or more vehicle systems 230. Vehicle capability can be assessed, for example, by receiving information from vehicle hardware interfaces 227 to determine vehicle capabilities and identify a reachable set model. Path and planning module 237 can receive surrounding environment information (e.g., from computer vision module 233, and obstacle avoidance module 238). Path and planning module 237 can apply risk information and vehicle capability and capacity information to trajectory information (e.g., based on a planned trajectory and driver intent) to determine a safe or optimized trajectory for the vehicle 200 given the driver's intent, policies (e.g. safety or vehicle cooperation policies), communicated information, given one or more obstacles in the surrounding environment, and road conditions. This trajectory information can be provided to controller (e.g., ECU 225) to provide partial or full vehicle control in the event of a risk level above threshold. A signal from risk assessment module 232 can be used generate countermeasures described herein. A signal from risk assessment module 232 can trigger ECU 225 or another AV control system 240 to take over partial or full control of the vehicle 200.

Figure 3:
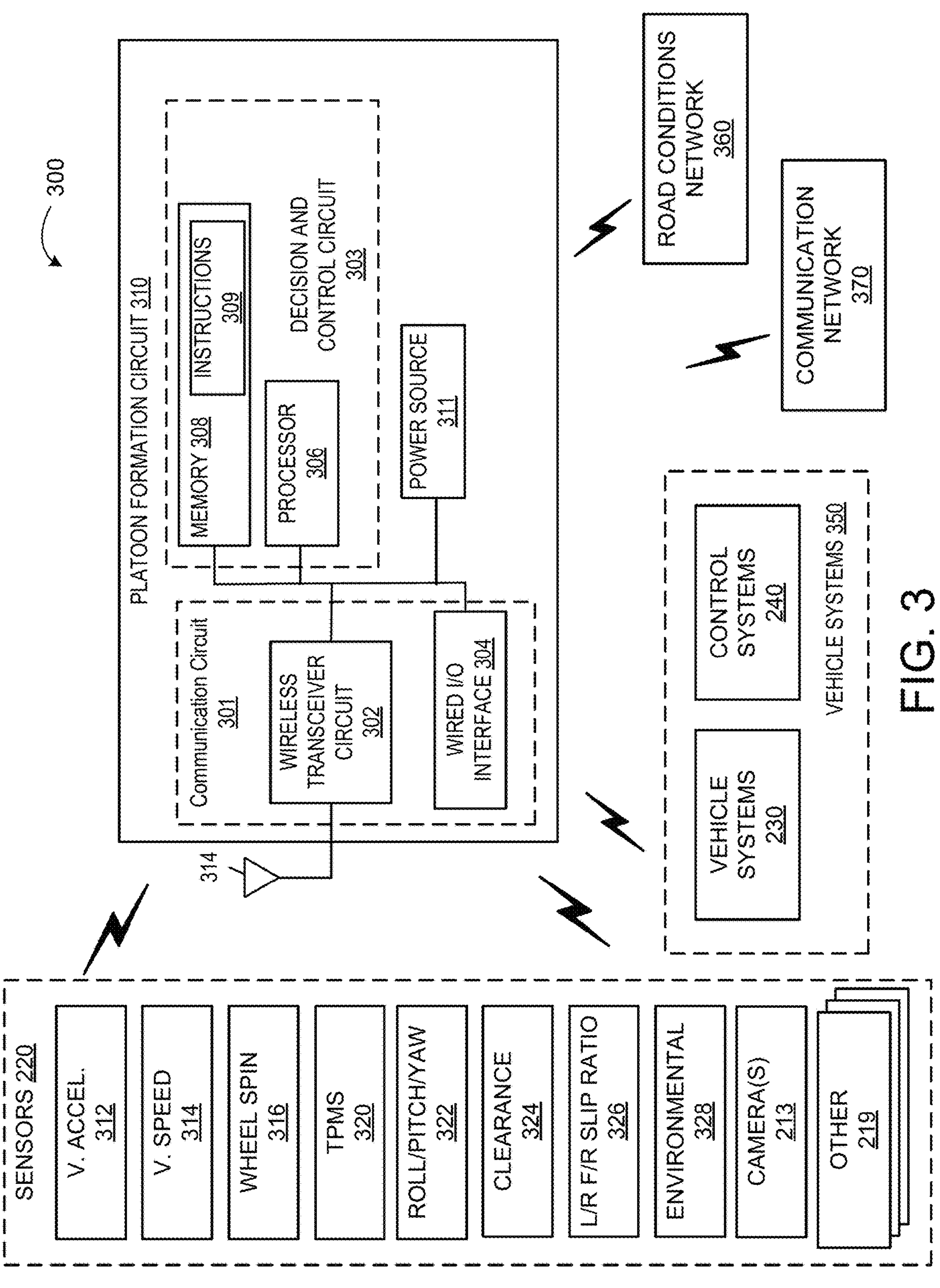
FIG. 3 illustrates an example system for platoon formation, according to example applications described in the present disclosure.

FIG. 3 illustrates an example architecture for platoon formation described herein. Referring now to FIG. 3, in this example, a platoon formation system 300 includes a platoon formation circuit 310, a plurality of sensors 220, and a plurality of vehicle systems 350. Also included are various elements of road conditions network 360 and communication network 370 with which the platoon formation system 300 can communicate. It can be understood that a road conditions network 360 can include various elements that are navigating and important in navigating a road conditions network, such as vehicles, pedestrians (with or without connected devices that can include aspects of platoon formation system 300 disclosed herein), infrastructure (e.g. traffic signals, sensors, such as traffic cameras, databases, central servers, weather sensors), location, traffic, or time (e.g. day of the week, hour of the day, etc.). Other elements of the road conditions network 360 can include connected elements at workplaces, or the home (such as vehicle chargers, connected devices, appliances, etc.). It can be understood that a communication 370 can include various elements that are navigating and important in navigating a communication network, such as bandwidth, latency (i.e., propagation time, transmission time, queuing time, processing delay), throughput, jitter, congestion, etc.

Platoon formation system 300 can be implemented as and include one or more components of the vehicle 200 shown in FIG. 2. Sensors 220, vehicle systems 350, elements of road conditions network 360, and elements of communication network 370 can communicate with the platoon formation circuit 310 via a wired or wireless communication interface. As previously alluded to, elements of road conditions network 360 can correspond to connected or unconnected devices, infrastructure (e.g. traffic signals, sensors, such as traffic cameras, weather sensors), vehicles, pedestrians, obstacles, etc. that are in a broad or immediate vicinity of ego vehicle (e.g., vehicle 200) or otherwise important to the navigation of the road conditions network (such as remote infrastructure). Elements of communication network 370 can correspond to connected or unconnected devices and vehicles that are associated to ego vehicle (e.g., vehicle 200) or otherwise important elements to the navigation of the communication network (such as remote infrastructure). Although sensors 220, vehicle systems 350, road conditions network 360, and communication network 370 are depicted as communicating with platoon formation circuit 310, they can also communicate with each other, as well as with other vehicle systems 350 and directly with elements of a road conditions network 360 and communication network 370. Data as disclosed herein can be communicated to and from the platoon formation circuit 310. For example, various infrastructure (example element of road conditions network 360 or communication network 370) can include one or more databases, such as vehicle crash data, weather data, or traffic data. This data can be communicated to the circuit 310, and such data can be updated based on outcomes for one or more maneuvers or navigation of the road conditions network, communication network, vehicle telematics, driver state (physical and mental), vehicle data from sensors 220 (e.g., tire pressure or brake status) from the ego vehicle. Similarly, traffic data, vehicle state data, time of travel, demographics data for drivers can be retrieved and updated. All of this data can be included in and contribute to predictive analytics (e.g., by machine learning) of accident possibility, determinations of road conditions and poor, hazard road conditions, and communication network capabilities. Similarly, models, circuits, and predictive analytics can be updated according to various outcomes.

Platoon formation circuit 310 can evaluate road conditions of roads and driving patterns of vehicles, detect lanes of a road, and generate a platoon formation strategy to identify vehicles compatible to form a platoon and generate a platoon route to navigate the platoon of vehicles to a destination as described herein. As will be described in more detail herein, the formation of a platoon of vehicles can have one or more contributing factors. Various sensors 220, vehicle systems 350, road conditions network 360, and communication network 370 elements may contribute to gathering data for evaluating road conditions of roads, evaluating driving patterns of vehicles, identifying lanes of a road, evaluating vehicle capabilities, and evaluating communication network capabilities. For example, the platoon formation circuit 310 can include at least one of a platoon formation detection and response circuit. The platoon formation circuit 310 can be implemented as an ECU or as part of an ECU such as, for example electronic control unit 225. In other applications, platoon formation circuit 310 can be implemented independently of the ECU, for example, as another vehicle system.

Platoon formation circuit 310 can be configured to evaluate road conditions of roads, driving patterns of vehicles, detect lanes of a road, generate a platoon formation strategy to identify vehicles compatible to form a platoon to traverse to a destination of at least one vehicle, and appropriately respond. Platoon formation circuit 310 may include a communication circuit 301 (including either or both of a wireless transceiver circuit 302 with an associated antenna 314 and wired input/output (I/O) interface 304 in this example), a decision and control circuit 303 (including a processor 306 and memory 308 in this example) and a power source 311 (which can include power supply). It is understood that the disclosed platoon formation circuit 310 can be compatible with and support one or more standard or non-standard messaging protocols.

Components of platoon formation circuit 310 are illustrated as communicating with each other via a data bus, although other communication in interfaces can be included. Decision and control circuit 303 can be configured to control one or more aspects of platoon formation and response. Decision and control circuit 303 can be configured to execute one or more steps described with reference to FIG. 4 and FIG. 7.

Processor 306 can include a GPU, CPU, microprocessor, or any other suitable processing system. The memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308 can be made up of one or more modules of one or more different types of memory, and may be configured to store data and other information as well as operational instructions 309 that may be used by the processor 306 to execute one or more functions of platoon formation circuit 310. For example, data and other information can include vehicle data, such as a determined familiarity of the driver with driving and the vehicle. The data can also include values for signals of one or more sensors 220 useful in detecting and identifying vehicles compatible to form a platoon and generating platoon routes to navigate platoons to reach their respective destinations. Operational instruction 309 can contain instructions for executing logical circuits, models, and methods as described herein.

Although the example of FIG. 3 is illustrated using processor and memory circuitry, as described below with reference to circuits disclosed herein, decision and control circuit 303 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a platoon formation circuit 310. Components of decision and control circuit 303 can be distributed among two or more decision and control circuits 303, performed on other circuits described with respect to platoon formation circuit 310, be performed on devices (such as cell phones) performed on a cloud-based platform (e.g. part of infrastructure), performed on distributed elements of the road conditions network 360, such as at multiple vehicles, user device, central servers, performed on an edge-based platform, performed on distributed elements of the communication network 370, and performed on a combination of the foregoing.

Communication circuit 301 may include either or both a wireless transceiver circuit 302 with an associated antenna 314 and a wired I/O interface 304 with an associated hardwired data port (not illustrated). As this example illustrates, communications with platoon formation circuit 310 can include either or both wired and wireless communications circuits 301. Wireless transceiver circuit 302 can include a transmitter and a receiver (not shown), e.g., a platoon formation broadcast mechanism, to allow wireless communications via any of a number of communication protocols such as, for example, WiFi (e.g. IEEE 802.11 standard), Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by platoon formation circuit 310 to/from other components of the vehicle, such as sensors 220, vehicle systems 350, infrastructure (e.g., servers cloud based systems), and other devices or elements of road conditions network 360 and communication network 370. These RF signals can include information of almost any sort that is sent or received by the ego vehicle.

Wired I/O interface 304 can include a transmitter and a receiver (not shown) for hardwired communications with other devices. For example, wired I/O interface 304 can provide a hardwired interface to other components, including sensors 220, vehicle systems 350. Wired I/O interface 304 can communicate with other devices using Ethernet or any of a number of other wired communication protocols whether standardized, proprietary, open, point-to-point, networked or otherwise.

Power source 311 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 311 can be coupled to a power source of the ego vehicle, such as a battery and alternator. Power source 311 can be used to power the platoon formation circuit 310.

Sensors 220 can include one or more of the previously mentioned sensors 220. Sensors 220 can include one or more sensors that may or not otherwise be included on a standard vehicle (e.g., vehicle 200) with which the platoon formation circuit 310 is implemented. In the illustrated example, sensors 220 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, environmental sensors 328 (e.g., to detect weather, salinity or other environmental conditions), and camera(s) 213 (e.g. front rear, side, top, bottom facing). Additional sensors 219 can also be included as may be appropriate for a given implementation platoon formation system 300.

Vehicle systems 350 can include any of a number of different vehicle components or subsystems used to control or monitor various aspects of the ego vehicle and its performance. For example, it can include any or all of the aforementioned vehicle systems 230 and control systems 240 shown in FIG. 2. In this example, the vehicle systems 350 may include a GPS or other vehicle positioning system 218.

During operation, platoon formation circuit 310 can receive information from various vehicle sensors 220, vehicle systems 350, road conditions network 360, and communication network 370 to identify vehicles and generate platoon routes. Also, the driver, owner, and operator of the ego vehicle may manually trigger one or more processes described herein for evaluating road conditions of roads, driving patterns of vehicles, generating a platoon formation strategy to identify vehicles compatible to form a platoon, and generate platoon routes to navigate platoons of vehicles. Communication circuit 301 can be used to transmit and receive information between the platoon formation circuit 310, sensors 220 and vehicle systems 350. Also, sensors 220 and platoon formation circuit 310 may communicate with vehicle systems 350 directly or indirectly (e.g., via communication circuit 301 or otherwise). Communication circuit 301 can be used to transmit and receive information between platoon formation circuit 310, one or more other systems of a vehicle 200, but also other elements of a road conditions network 360, such as vehicles, devices (e.g., mobile phones), systems, networks (such as a communications network and central server), and infrastructure, and elements of a communication network 370.

In various applications, communication circuit 301 can be configured to receive data and other information from sensors 220 and vehicle systems 350 that is used in forming platoons of vehicles. As one example, when data is received from an element of road conditions network 360 (such as from a driver's user device), communication circuit 301 can be used to send an activation signal and activation information to one or more vehicle systems 350 or sensors 220 for the vehicle to detect and identify the high occupancy lanes and vehicles compatible for platooning. For example, it may be useful for vehicle systems 350 or sensors 220 to provide data useful in detecting and identifying platoon compatible vehicles, and generating platoon routes to navigate platoons of vehicles. Alternatively, platoon formation circuit 310 can be continuously receiving information from vehicle system 350, sensors 220, other vehicles, devices and infrastructure (e.g., those that are elements of road conditions network 360 and elements of communication network 370). Further, upon identifying platooning compatible vehicles, communication circuit 301 can send a signal to other components of the vehicle, infrastructure, or other elements of the road conditions network and communication network based on the identification of the platooning compatible vehicles. For example, the communication circuit 301 can send a signal to a vehicle system 350 that indicates a control input for performing one or more vehicle movement patterns to navigate around any obstructions on roads according to the determined road conditions, form platoons between compatible vehicles, and navigate the platoons of vehicles to their respective destinations. In some applications upon identifying platooning compatible vehicles, the driver's control of the vehicle can be prohibited, and control of the vehicle can be offloaded to the ADAS. In more specific examples, upon identifying platooning compatible vehicles (e.g., by sensors 220, and vehicle system 350, by elements of the road conditions network 360, or by elements of the communication network 370), one or more signals can be sent to a vehicle system 350, so that an assist mode can be activated and the vehicle can control one or more of vehicle systems 230 (e.g., steering system 221, throttle system 222, brakes 223, transmission 224, ECU 225, propulsion system 226, suspension, and powertrain).

The examples of FIGS. 2 and 3 are provided for illustration purposes only as examples of vehicle 200 and platoon formation system 300 with which applications of the disclosed technology may be implemented. One of ordinary skill in the art reading this description will understand how the disclosed applications can be implemented with vehicle platforms.

Figure 4:
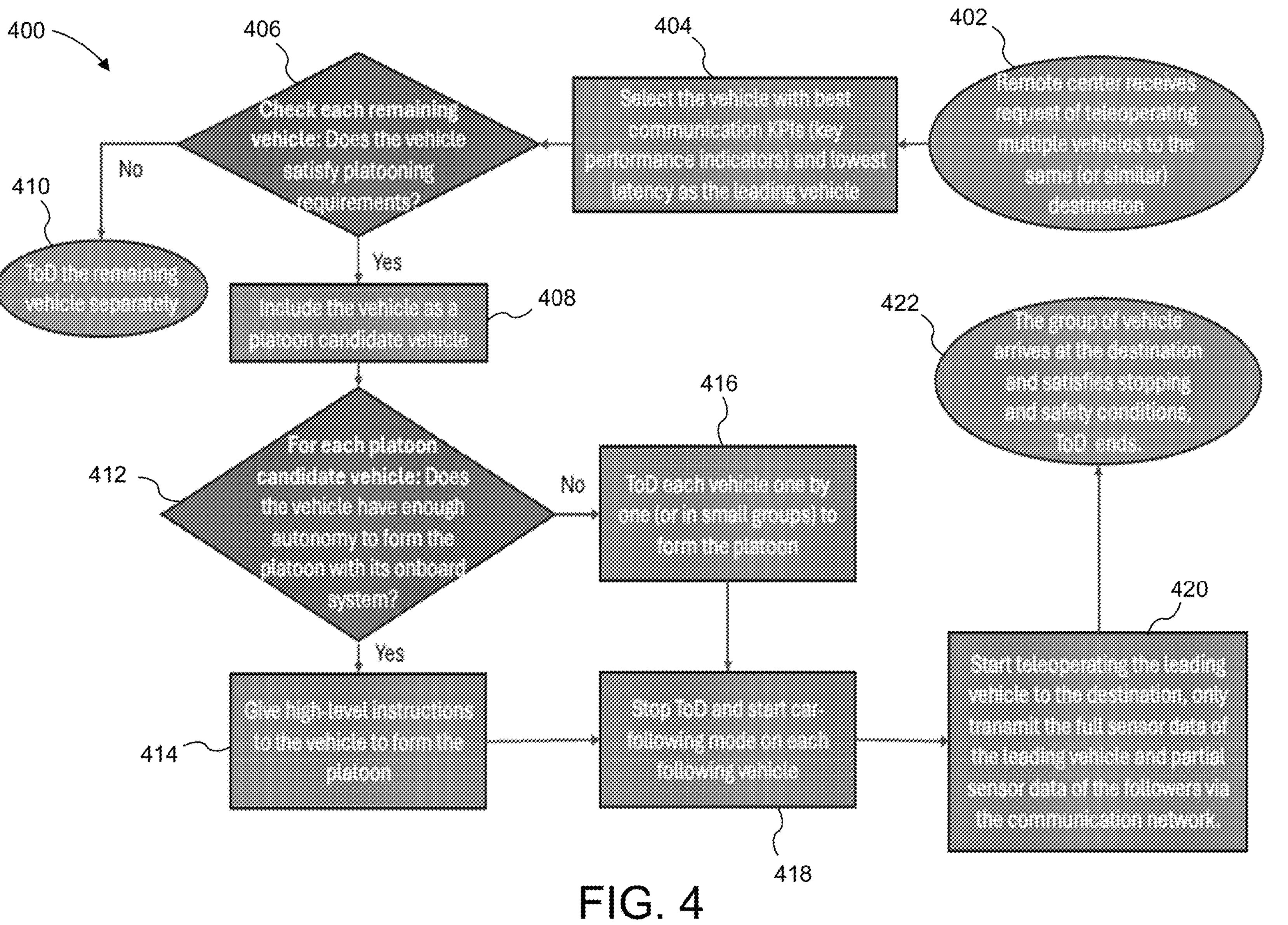
FIG. 4 illustrates an example process for platoon formation, according to example applications described in the present disclosure.

FIG. 4 illustrates an example process 400 that includes one or more steps that may be performed to form a platoon of vehicles. In some applications, the process 400 can be executed, for example by the computing component 110 of FIG. 1. In another application, the process 400 may be implemented as the computing component 110 of FIG. 1. In other applications, the process 400 may be implemented as, for example, the computing system 210 of FIG. 2, the platoon formation system 300 of FIG. 3, the platoon formation system 600 of FIGS. 6A-6C, the computing component 700 of FIG. 7, and the computing component 800 of FIG. 8. The process 400 may include a server. The process 400 may be implemented by one or more vehicles where the one or more vehicles may form a P2P or V2V network.

At step 402, the computing component 110 may receive request of teleoperating multiple vehicles to the same (or similar) destination. An ego vehicle may be traveling on a road. The ego vehicle may collect sensor data of the road upon which the ego vehicle is traveling. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation.

The ego vehicle may include one or more sensors that may be used to collect sensor data and map data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received from at least one sensor of the ego vehicle. The sensor data may include information on the condition of the road, damages to the road, hazardous features on the road, attributes of the road (i.e., the color, size, type and shape of lane markers, number of lanes, etc.), types of lanes (i.e., high occupancy lanes, merging lanes, exiting lanes, passing lanes, slow lanes, turning lanes, etc.), environmental conditions, lane markers and markings within the lane, map, location, traffic, speed, direction, and objects on, proximate to, and associated with the road that is collected by the ego vehicle. An object on the road may include a pothole, crack, tire marking, faded road marking, debris, occlusion, road reflection, flooding, ice, fire, oil leak, uneven pavement, erosion, raveling, sign, pole, building, structure, pedestrian, animal, and vehicle. The environmental condition may include location, coordinates, population, landscape, landmark, terrain, territory, weather, temperature, humidity, pollution, habitat, and other environmental surroundings on, proximate to, or associated with the road that the ego vehicle is traveling on.

The ego vehicle may collect map data of the road that the ego vehicle is traveling on. The map data, which may be stored onboard the vehicle or obtained from the cloud or other infrastructure element, may include location, coordinates, population, landscape, landmark, terrain, territory, weather, temperature, humidity, pollution, habitat, and other environmental surroundings on, proximate to, and associated with the road that the ego vehicle is traveling on. The map data, sensor data or both may be analyzed to determine a position of the ego vehicle on the road.

The ego vehicle may generate and send a platoon formation message to a remote center, such as, for example, a platoon formation system. The platoon formation message may be a message presenting the ego vehicle's intention to seek to join a platoon of vehicles. The platoon formation message of the ego vehicle may include a location of the ego vehicle (i.e., information associated with the precise position of the ego vehicle on the road it is traversing on), destination of the ego vehicle (i.e., information associated with the precise position of the destination that the ego vehicle is traveling to reach), driving preference of the ego vehicle (i.e., information associated with the preference of the driver of the ego vehicle, including, for example, an average speed of travel, maximum speed of travel, maximum number of vehicles in a platoon, etc.), and one or more vehicular capabilities of the ego vehicles (i.e., latency, longitudinal stability, lateral deviation, communication, driving performance, etc.). The ego vehicle may use one or more sensors to determine its location, destination, driving preference, and vehicular capabilities. The ego vehicle may use one or more forms of communication to send the platoon formation message to the platoon formation system.

The platoon formation system may receive platoon formation messages from numerous vehicles. The platoon formation system may analyze the received platoon formation messages to determine a plurality of vehicles that are in a same location or locations in close proximity of each other. The location of the ego vehicle may include information associated with the precise position of the ego vehicle on the road it is traversing on. The location of the ego vehicle may be determined according to a GPS of the ego vehicle. The platoon formation system may identify such one or more vehicles at one or more locations within a distance threshold of each other by analyzing the platoon formation message of each of the one or more vehicles. The distance threshold may be a maximum distance between a set location, such as the location of the ego vehicle, and the location of another vehicle. The distance threshold may be a preset value. The distance threshold may vary according to one or more factors, including, for example, time of day, day of week, set location, type of road, traffic on the road, road conditions, environmental conditions, etc. The distance threshold may vary according to conditions and features of the road as determined from sensor data of one or more vehicles, including, for example, the ego vehicle. The distance threshold may be updated according to algorithms and models using driving data of vehicles. Many variations are possible.

The platoon formation system may determine a plurality of vehicles in the same location or close proximity of each other that are traveling to a same destination or destinations in close proximity of each other. The destination of the ego vehicle may include information associated with the precise position of the destination that the ego vehicle is traveling to reach as its final destination. The destination of the ego vehicle may be determined according to a GPS of the ego vehicle. The platoon formation system may determine which vehicles of the plurality of vehicles has a destination of travel that is within a destination threshold of a set destination, such as, for example, the destination of the ego vehicle. The destination threshold may be a maximum distance between the set destination and the destination of another vehicle. The destination threshold may be a maximum distance between the set destination and the route of travel of the another vehicle to the destination of the another vehicle, and vice versa. Many variations are possible. The destination threshold may be a preset value. The destination threshold may vary according to one or more factors, including, for example, time of day, day of week, set destination, type of road being traveled on, route of travel, traffic on the road, road conditions, environmental conditions, etc. The destination threshold may vary according to conditions and features of the road as determined from sensor data of one or more vehicles, including, for example, the ego vehicle. The destination threshold may be updated according to algorithms and models using driving data of vehicles. Many variations are possible. The platoon formation system may group these plurality of vehicles together to potentially form one or more platoons of vehicles.

At step 404, the computing component 110 may select a vehicle from the plurality of vehicles with a best communication key performance indicators (KPIs) and lowest latency as the leading vehicle. Upon determining a plurality of vehicles that are in the same location (or location in close proximity of each other) and that are traveling to a same destination (or destinations in close proximity of each other), the platoon formation system may further analyze the platoon formation messages from the plurality of vehicles to determine the latency vehicular capability of each of the plurality of vehicles. Each platoon formation message of the plurality of vehicles may include a latency vehicular capability of a respective vehicle that represents the amount of time needed for data to pass from the respective vehicle to a communication network.

The platoon formation system may determine which of the plurality of vehicles has a latency vehicular capability that is within a teleoperated driving (ToD) threshold. The ToD threshold may be an overall latency allowed for a platoon of vehicles. The ToD threshold may be set according to a communication network being used by the platoon formation system to communicate to each vehicle in a platoon. The ToD threshold may be set according to one or more communication channels available for use in a communication network used by the platoon formation system to communicate to each vehicle in a platoon. The ToD threshold may be a preset value. The ToD threshold may vary according to one or more factors, including, for example, time of day, day of week, location of the plurality of vehicles, bandwidth of the communication network, network traffic, number of devices on the communication network, network latency, environmental conditions, etc. The ToD threshold may be updated according to algorithms and models using data on communication networks and channels for vehicle communication. Many variations are possible. Any and all of the plurality of vehicles that have a latency vehicular capability that is within a ToD threshold may be grouped in a subset.

The platoon formation system may determine a subset of vehicles from the plurality of vehicles that have a latency vehicular capability that is within the ToD threshold. Each vehicle in the subset may have its own value of latency vehicular capability. The platoon formation system may determine which vehicle in the subset has a lowest value of latency vehicular capability. The platoon formation system may determine which vehicle in the subset has the best communication KPIs, where the KPIs indicate the communication capabilities of the vehicle, such as, for example, end-to-end latency, camera image quality, vehicle size, communication resources, etc. The platoon formation system may label the vehicle with the lowest value of latency vehicular capability and best communication KPIs as a lead vehicle for a platoon.

At step 406, the computing component 110 may check the remaining vehicles to determine if one or more vehicles satisfy platooning requirements. The platoon formation system may determine, from the subset of vehicles that have a latency vehicular capability that is within the ToD threshold, one or more follow vehicles to join the platoon with the chosen lead vehicle. A vehicle from the subset of vehicles may be labeled as a follow vehicle when it includes a one or more vehicular capabilities that collectively meet requirements for a follow vehicle in a platoon. The one or more vehicular capabilities of a vehicle that are considered to determine whether such vehicle can be labeled as a follow vehicle include longitudinal stability, lateral stability, lateral deviation, communication, and driving performance (i.e., capabilities of the vehicle that affect its ability to be driven, including steering, braking, acceleration, deceleration, throttle, etc.).

The requirements for a follow vehicle may be set as a platoon following threshold that a vehicle may have to meet to be able to join a platoon as a following vehicle. The platoon following threshold may be a preset value. The platoon following threshold may vary according to one or more factors, including, for example, time of day, day of week, location of the plurality of vehicles, destination of travel, lead vehicle, type of road being traveled on, route of travel, traffic on the road, road conditions, environmental conditions, etc. The platoon following threshold may be updated according to algorithms and models using data on platooning. Many variations are possible. The platoon formation system may label one or more vehicles in the subset as a follow vehicle for the platoon with the lead vehicle.

If the platoon formation system identifies at least one vehicle in the subset of vehicles that meet the platoon following threshold to join the platoon as a follow vehicle, proceed to step 408. Otherwise, if the platoon formation system does not identify any vehicle in the subset of vehicles that meets the platoon following threshold to join the platoon as a follow vehicle, proceed to step 410.

At step 408, the computing component 110 may include any vehicle that meets the platoon following threshold as a platoon candidate vehicle. Such a platoon candidate vehicle may be referred to as a follow vehicle that may form a platoon with the lead vehicle. More than one follow vehicle may join the platoon with the lead vehicle in it.

At step 410, the computing component 110 may determine that a platoon may not be formed with the vehicles in the subset and each remaining vehicle may be provided with separate ToD operations to separately navigate through traffic to reach their respective destinations. The platoon formation system may monitor each vehicle in the subset separately and generate ToD operations for each vehicle to implement to navigate through traffic to reach their respective destination. The ToD operations provided to a vehicle may be based on data obtained by the respective vehicle that is transmitted to the platoon formation system.

At step 412, the computing component 110 may determine, for each platoon candidate vehicle (i.e., follow vehicle), whether such vehicle has enough autonomy to form the platoon with the lead vehicle. The platoon formation system may determine the level of autonomy of each follow vehicle. The level of autonomy of a vehicle may be indicative of the ability of the vehicle to operate autonomously, such as, for example, level 0 of no driving automation, level 1 of driver assistance, level 2 of partial driving automation, level 3 of conditional driving automation, level 4 of high driving automation, and level 5 of full driving automation. Level 0 of no driving automation may be indicative of a vehicle only being capable of being manually controlled and operated. Level 1 of driver assistance may be indicative of a vehicle featuring a single automated system (e.g., the system monitors speed through cruise control). Level 2 of partial driving automation may be indicative of a vehicle having advanced driver assistance systems (ADAS) where the vehicle can perform automatically perform and control steering and acceleration/deceleration, with a driver being able to take control at any time. Level 3 of conditional driving may be indicative of a vehicle having environmental detection capabilities where the device can perform most driving tasks but a driver is still required. Level 4 of high driving automation may be indicative of a vehicle being able to perform all driving tasks under specific circumstances, such as, for example, within a limited or geofenced area. Level 5 of full driving automation may be indicative of a vehicle being able to perform all driving tasks under any and all conditions, where driver attention and interaction is not required.

According to the level of autonomy of a follow vehicle, the platoon formation system may determine whether the follow vehicle may be able to obtain high-level instructions to form a platoon or may need to be provided with separate ToD operations to form the platoon. If the platoon formation system determines that a follow vehicle may receive and follow high-level instructions to form a platoon, proceed to step 414. Otherwise, if the platoon formation system determines that a follow vehicle may need to receive and follow separate ToD operations to form a platoon, proceed to step 416.

At step 414, the computing component 110 may provide instructions to each of the lead and follow vehicles to form a platoon. After determining the lead vehicle and the one or more follow vehicles for a platoon, the platoon formation system may have the lead vehicle and the one or more follow vehicles form the platoon. To establish a platoon between the lead vehicle and one or more follow vehicles, the platoon formation system may generate a platoon formation strategy. The platoon formation strategy may include instructions for each vehicle to execute to establish a platoon. The platoon formation system may send the platoon formation strategy to each vehicle involved in forming a platoon. Each vehicle determined to form a platoon may execute instructions from the platoon formation strategy to establish the platoon. Each vehicle may have its own set of instructions to execute to efficiently and effectively form the platoon.

At step 416, the computing component 110 may determine that a follow vehicle may need to receive and follow separate ToD operations to form the platoon. The platoon formation system may provide a follow vehicle that does not have a high enough level of autonomy with separate ToD operations to form the platoon with the lead vehicle and any other follow vehicles. The platoon formation system may monitor such a follow vehicle and generate ToD operations for the follow vehicle to implement to navigate through traffic to form the platoon with the lead vehicle and any other follow vehicles. The ToD operations provided to a follow vehicle may be based on data obtained by the respective follow vehicle that is transmitted to the platoon formation system.

Each vehicle may be assigned a particular position in the platoon, such as, for example, a lead position, following position, middle position, end position, first position, second position, third position, etc. The position assigned to the lead vehicle may be the first, lead position in the platoon. The position assigned to each of the follow vehicles may be assigned at random by the platoon formation system. The position assigned to each follow vehicle may be based on one or more factors, including, for example, driving preference of each follow vehicle, location of each follow vehicle, destination of each follow vehicle, vehicular capabilities of each follow vehicle, traffic, route of travel, environmental conditions, etc. The driving preference of a vehicle may include information associated with the preference of the driver of the vehicle, including, for example, an average speed of travel, maximum speed of travel, position in a platoon that the driver of the vehicle is comfortable with being at, etc.

At step 418, the computing component 110 may stop ToD operations and start car-following mode on each of the follow vehicles. Upon forming the platoon between the lead vehicle and the one or more follow vehicles, the platoon formation system may link one or more communication channels of each of the lead and follow vehicles. By linking one or more communication channels of the lead and follow vehicles, each vehicle in the platoon may be able to communicate with one another. Each of the lead and follow vehicles in the platoon may be able to send messages and data to one another using the linked communication channel (s). Each vehicle may have its own sensor data. The sensor data of each vehicle may include a direction, speed, driving pattern, location, road condition, map, location, traffic, object, and environmental condition that the respective vehicle encounters while traveling on the road. Each vehicle in the platoon may have one or more sensors capable of collecting data of the road and the driving performance of the respective vehicle. One or more sensors, either individually or in combination, may be able to collect data on the road, such as sensor data, to determine conditions and features of the road. The one or more sensors, either individually or in combination, may be able to collect data on the driving performance of the respective vehicle to determine the driving pattern of the respective vehicle on the road. The one or more sensors of the vehicle used to collect data may include, for example, a camera, image sensor, radar sensor, light detection and ranging (LIDAR) sensor, position sensor, audio sensor, infrared sensor, microwave sensor, optical sensor, haptic sensor, magnetometer, communication system and global positioning system (GPS).

Upon forming the platoon with the lead and one or more follow vehicles, the platoon formation system may deactivate one or more sensors of each follow vehicle. By deactivating the one or more sensors of each follow vehicle, each follow vehicle may be unable to collect data relative to the road, vehicles, traffic, environment, and driving performance of the respective vehicle. The platoon formation system may deactivate the one or more sensors of each follow vehicle to limit the use of the one or more sensors, such as deactivating (or restricting) the video streaming capabilities of the one or more follow vehicles. Deactivating the video streaming capabilities of a vehicle may prevent the vehicle from collecting and transmitting video data that the vehicle may be able to obtain using one or more sensors. By deactivating one or more sensors and data collecting capabilities of a follow vehicle in a platoon, the platoon formation system may be able to reduce the amount of bandwidth being used in a communication network, which may reduce the amount of latency needed for vehicles in a platoon to communicate to each other to navigate and travel via platooning. Reducing the amount of bandwidth and latency that may be necessary for a platoon of vehicles to communicate between may improve the accuracy and efficiency in platooning vehicles.

The platoon formation system may activate car-following mode for each of the follow vehicles in the platoon. The car-following mode of each follow vehicle may allow each follow vehicle to implement any and all instructions provided to it from the platoon formation system and lead vehicle, based on data obtained by the lead vehicle. For example, the car-following mode may allow each follow vehicle in the platoon to mimic the actions performed by the lead vehicle when navigating through traffic and traveling to a destination.

At step 420, the computing component 110 may start teleoperating the lead vehicle to the destination with the follow vehicles mimicking the actions of the lead vehicle. While the platoon formation system may deactivate one or more sensors and data collecting capabilities of the one or more follow vehicles, the platoon formation system may allow the lead vehicle to have all of its sensors active and collect data relative to all aspects of the road, vehicles, traffic, environment, and driving performance of the lead vehicle and each of the follow vehicles. The platoon formation system may use the data collected by the one or more sensors of the lead vehicle to generate a platoon route for the platoon. The data collected by the lead vehicle may include video streaming data that is collected using one or more sensors that visually display information relative to the road, surrounding vehicles, traffic, environment, and driving performance of the lead vehicle and each of the follow vehicles.

The platoon formation system may generate the platoon route to include a route for each vehicle in the platoon to follow to reach at least one destination of the vehicles in the platoon. The platoon route may be generated according to one or more factors, including, for example, time of day, day of week, destination of one or more vehicles in the platoon, type of road the platoon of vehicles is traveling on, traffic on the road, road conditions, environmental conditions, safety, energy efficiency, road capacity, comfort, vehicular capabilities of each vehicle in the platoon, etc. The safety factor may be associated with a minimum amount of safety conditions that the vehicles in a platoon may have to follow when traveling as a platoon, including, for example, a minimum distance of space between each vehicle in the platoon based on the speed of the platoon, maximum speed of travel allowed by each vehicle in the platoon, minimum distance of space between the lead vehicle of the platoon and the vehicle in front of the platoon, etc. The energy efficiency factor may be associated with an amount of energy that each vehicle in the platoon may need to conserve when traveling in the platoon. The road capacity factor may be associated with a number of vehicles on the road and near the location of the platoon of vehicles. The comfort factor may be associated with at least one of driving preferences of each driver of each vehicle in the platoon, capabilities of each vehicle in the platoon, road conditions, environmental conditions, traffic, etc. Each factor considered in generating the platoon route may be based on capabilities of each vehicle in the platoon, the location of the platoon of vehicles, characteristics of the road, environmental conditions, etc. The platoon formation system may update the platoon route according to changes in the one or more factors. The platoon formation system may send the platoon route to each vehicle in the platoon.

After a platoon of vehicles is formed, the platoon of vehicles may travel on the road according to the platoon route generated by the platoon formation system using data obtained by the lead vehicle. As the platoon of vehicles is traveling to a destination, the platoon formation system may determine if the data obtained by the lead vehicle is adequate to accurately and efficiently generate a platoon route for the platoon of vehicles to follow. Upon a determination that the data obtained by the lead vehicle is insufficient, the platoon formation system may reactivate one or more sensors of one or more follow vehicles to collect additional data relative to the road, vehicles, traffic, environment, and driving performance of the lead vehicle and each of the follow vehicles. The platoon formation system may collectively use the data obtained by the lead vehicle and the data obtained by the one or more follow vehicles to generate the platoon route for the platoon of vehicles to follow. The platoon formation system may choose which one or more sensors of which one or more follow vehicles to activate according to the availability of resources in the communication network. The platoon formation system may monitor the amount of data being collected by the lead vehicle and one or more follow vehicles to deactivate sensors accordingly to prevent the amount of data being transmitted from exceeding an overload limit. By keeping the amount of data being transmitted within an overload limit, the platoon formation system may decrease the amount of congestion on the communication network used by the platoon of vehicles while increasing the accuracy and efficiency in platooning vehicles. Many variations are possible.

At step 422, the computing component 110 may determine that the platoon of vehicles arrived at the destination and end ToD operations. Upon reaching the destination of the platoon, the platoon formation system may disassemble the platoon of vehicles. Disassembling the platoon of vehicles may include disconnecting the communication channels of each vehicle in the platoon. Disassembling the platoon of vehicles may include reactivating one or more sensors of one or more follow vehicles that may have been previously deactivated during platooning.

A vehicle in a platoon may disengage from the platoon before reaching the destination for a variety of reasons, including, for example, when the vehicle reaches a point in the platoon route where it needs to disengage and separate itself to reach its respective destination, when the vehicle has to make a stop (e.g., to refill gas, recharge vehicle battery, purchase food, use restroom, take rest stop, fix vehicle, buy medicine, etc.), when the driver of the vehicle chooses to no longer be in the platoon, and when the platoon has reached its final destination. A vehicle in a platoon may disengage from the platoon by sending a platoon disengage message to the platoon formation system. The platoon formation system may disengage a vehicle from a platoon by sending instructions to the vehicle for disengaging from the platoon. The platoon formation system may disengage a vehicle from a platoon without first receiving a platoon disengage message, when the platoon formation system determines that the vehicle needs to be disengaged from the platoon based on the platoon formation message of the respective vehicle. Many variations are possible.

When a vehicle in a platoon is determined to be disengaged from the platoon, the platoon formation system may send instructions to the disengaging vehicle to disengage from the platoon formation. The platoon formation system may generate an updated platoon formation strategy for each remaining vehicle in the platoon and send the updated platoon formation strategy to each remaining vehicle. Each remaining vehicle may execute the updated platoon formation strategy to establish an updated platoon formation upon the separation of the disengaged vehicle. In one example, if the third vehicle in a four vehicle platoon is determined to disengage from the platoon, an updated platoon formation strategy may be provided to have the remaining vehicles establish an updated platoon formation where the fourth vehicle will now move closer to the second vehicle and take the place of the disengaged third vehicle. The updated platoon formation may now consist of only the remaining three vehicles. In another example, if the first vehicle in a four vehicle platoon is determined to disengage from the platoon, an updated platoon formation strategy may be provided to have the remaining vehicles establish an updated platoon formation where the follow vehicle with the lowest latency vehicular capability becomes the lead vehicle of the platoon and takes the place of the disengaged first vehicle. The updated platoon formation may now consist of only the remaining three vehicles. Once the remaining vehicles have established the updated platoon formation, the updated platoon may continue traveling on the road according to the platoon route provided by the platoon formation system.

When a vehicle in a platoon is determined to be disengaged from the platoon, the platoon formation system may disconnect the communication channel(s) of the respective vehicle from the other vehicles in the platoon. The platoon formation system may reactivate any of the one or more sensors of the disengaged vehicle that may have been previously deactivated.

Each of the vehicles in a platoon may communicate to one another and to the platoon formation system using a P2P (peer-to-peer), V2V or other communication protocol. A platoon of vehicles may move together according to a navigation strategy (i.e., a platoon route) to travel efficiently, effectively, and safely navigate the platoon of vehicles on a road.

Monitoring data of various vehicles traveling on a road may permit up-to-date navigation information and road conditions, that may be analyzed to efficiently and accurately identify compatible vehicles for platoon formation and navigate a platoon of vehicles on a road. The efficient and accurate determination of compatible vehicles may improve the efficiency, effectiveness, and safety of forming platoons of vehicles and in the navigation of platoons of vehicles traveling on the road. Efficiently, effectively, and safely controlling platooning may further increase the avoidance of incidents and accidents occurring on the road.

For simplicity of description, the process 400 is described as being performed with respect to a single platoon. It should be appreciated that, in a typical embodiment, the computing component 110 may manage the determination of vehicles compatible and in consensus to form a plurality of platoons, at various locations, on various roads, in short succession of one another. For example, in some embodiments, the computing component 110 can perform many, if not all, of the steps in process 400 on a plurality of vehicles for a plurality of platoons on various roads as data is obtained from a plurality of vehicles.

Figure 5:
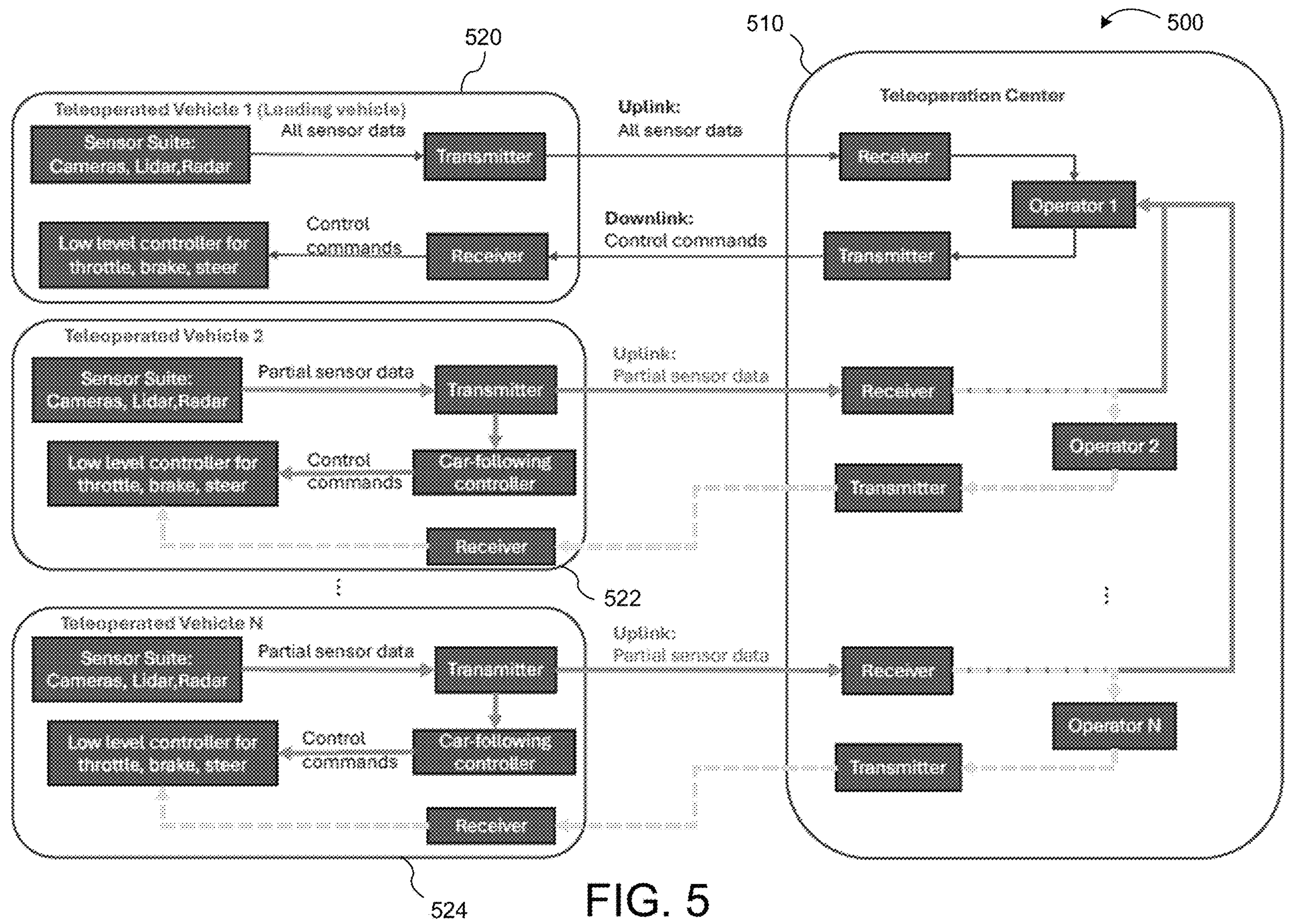
FIG. 5 illustrates an example communication network for a platoon of vehicles, according to example applications described in the present disclosure.

FIG. 5 illustrates an example communication network 500 for a platoon of vehicles. A teleoperation center, such as, for example, a platoon formation system 510, may be used to establish communications between a plurality of vehicles in a platoon. A platoon may include a lead vehicle and one or more follow vehicles. Each vehicle in the platoon may include its own communication system. For example, the lead vehicle may include a lead communication system 520, a first follow vehicle may include a follow communication system 522, a second follow vehicle may include a follow communication system 524, etc. Each communication system, such as lead communication system 520 and follow communication systems 522 and 524, may sensors, transmitter(s), receiver(s), and vehicle controllers. Sensors of a vehicle may include a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Vehicle controllers of a vehicle may include one or more components of the vehicle system of the vehicle that may control operations of the vehicle, include, for example, a steering system, throttle system, brakes, transmission, electronic control unit (ECU), propulsion system and vehicle hardware interfaces. Each of the follow communication systems 522 and 524 may include a car-following controller that may be used to guide the respective follow vehicle to implement operations and instructions that mimic the actions of the lead vehicle when navigating through traffic and traveling to the destination.

Upon forming the platoon between the lead vehicle and the one or more follow vehicles, the platoon formation system 510 may be used to link the communication systems 520, 522, and 524 of the lead and follow vehicles. For example, the platoon formation system 510 may link the lead communication system 520 and follow communication systems 522 and 524. The platoon formation system 510 may use one or more operators to communicate with each of the communication systems of the vehicles in the platoon. By linking the communication networks 520, 522, and 524 of the lead and follow vehicles, each vehicle in the platoon may be able to communicate with one another through the platoon formation system 510. Each of the lead and follow vehicles in the platoon may be able to send messages and data to one another through the platoon formation system 510.

Each vehicle may have its own sensor data. The sensor data of each vehicle may include a direction, speed, driving pattern, location, road condition, map, location, traffic, object, and environmental condition that the respective vehicle encounters while traveling on the road. Each vehicle in the platoon may have one or more sensors capable of collecting data of the road and the driving performance of the respective vehicle. One or more sensors, either individually or in combination, may be able to collect data on the road, such as sensor data, to determine conditions and features of the road. The one or more sensors, either individually or in combination, may be able to collect data on the driving performance of the respective vehicle to determine the driving pattern of the respective vehicle on the road.

Upon forming the platoon with the lead and one or more follow vehicles, the platoon formation system 510 may deactivate one or more sensors of each follow vehicle. By deactivating the one or more sensors of each follow vehicle, each follow communication system 522 and 524 of the follow vehicles may be unable to collect data relative to the road, vehicles, traffic, environment, and driving performance of the respective vehicle. The platoon formation system 510 may deactivate the one or more sensors of each follow vehicle to limit the use of the one or more sensors, such as deactivating (or restricting) the video streaming capabilities of the one or more follow vehicles. Deactivating the video streaming capabilities of a vehicle may prevent the vehicle's communication system from collecting and transmitting video data to the communication systems of the other vehicles in the platoon through the platoon formation system 510 that the respective vehicle may be able to obtain using one or more sensors. By deactivating one or more sensors and data collecting capabilities of a follow vehicle in a platoon, the platoon formation system 510 may be able to reduce the amount of bandwidth being used in a communication network, which may reduce the amount of latency needed for vehicles in a platoon to communicate to each other to navigate and travel via platooning. Reducing the amount of bandwidth and latency that may be necessary for a platoon of vehicles to communicate between may improve the accuracy and efficiency in platooning vehicles.

While the platoon formation system 510 may deactivate one or more sensors and data collecting capabilities of the one or more follow vehicles, the platoon formation system 510 may allow the lead vehicle to have all of its sensors active and collect data relative to all aspects of the road, vehicles, traffic, environment, and driving performance of the lead vehicle and each of the follow vehicles. The lead communication system 520 may send the data collected by the one or more sensors of the lead vehicle to the platoon formation system 510. The platoon formation system 510 may use the received data from the lead communication system 520 to generate a platoon route for the platoon. The data collected by the lead vehicle may include video streaming data that is collected using one or more sensors that visually display information relative to the road, surrounding vehicles, traffic, environment, and driving performance of the lead vehicle and each of the follow vehicles.

The platoon formation system 510 may generate the platoon route to include a route for each vehicle in the platoon to follow to reach at least one destination of the vehicles in the platoon. The platoon route may be generated according to one or more factors, including, for example, time of day, day of week, destination of one or more vehicles in the platoon, type of road the platoon of vehicles is traveling on, traffic on the road, road conditions, environmental conditions, safety, energy efficiency, road capacity, comfort, etc. The safety factor may be associated with a minimum amount of safety conditions that the vehicles in a platoon may have to follow when traveling as a platoon, including, for example, a minimum distance of space between each vehicle in the platoon based on the speed of the platoon, maximum speed of travel allowed by each vehicle in the platoon, minimum distance of space between the lead vehicle of the platoon and the vehicle in front of the platoon, etc. The energy efficiency factor may be associated with an amount of energy that each vehicle in the platoon may need to conserve when traveling in the platoon. The road capacity factor may be associated with a number of vehicles on the road and near the location of the platoon of vehicles. The comfort factor may be associated with at least one of driving preferences of each driver of each vehicle in the platoon, capabilities of each vehicle in the platoon, road conditions, environmental conditions, traffic, etc. Each factor considered in generating the platoon route may be based on capabilities of each vehicle in the platoon, the location of the platoon of vehicles, characteristics of the road, environmental conditions, etc. The platoon formation system 510 may update the platoon route according to changes in the one or more factors. The platoon formation system 510 may send the platoon route to the communication system of each vehicle in the platoon, including communication system 520, 522, and 524.

After a platoon of vehicles is formed, the platoon of vehicles may travel on the road according to the platoon route generated by the platoon formation system 510 using data obtained by the lead vehicle. As the platoon of vehicles is traveling to a destination, the platoon formation system 510 may determine if the data obtained by the lead communication system 520 is adequate to accurately and efficiently generate a platoon route for the platoon of vehicles to follow. Upon a determination that the data obtained by the lead communication system 520 is insufficient, the platoon formation system 510 may reactivate one or more sensors of one or more follow vehicles to collect additional data relative to the road, vehicles, traffic, environment, and driving performance of the lead vehicle and each of the follow vehicles. The platoon formation system 510 may collectively use the data obtained by the lead communication system 520 and the data obtained by the one or more follow communication system 522 and 524 of the follow vehicles to generate the platoon route for the platoon of vehicles to follow. The platoon formation system 510 may choose which one or more sensors of which one or more follow vehicles to activate according to the availability of resources in the communication network. The platoon formation system 510 may monitor the amount of data being collected by the lead communication system 520 and one or more follow communication systems 522 and 524 to deactivate sensors accordingly to prevent the amount of data being transmitted from exceeding an overload limit. By keeping the amount of data being transmitted within an overload limit, the platoon formation system 510 may decrease the amount of congestion on the communication network used by the platoon of vehicles while increasing the accuracy and efficiency in platooning vehicles. Many variations are possible.

Figures 6A, 6B, 6C:
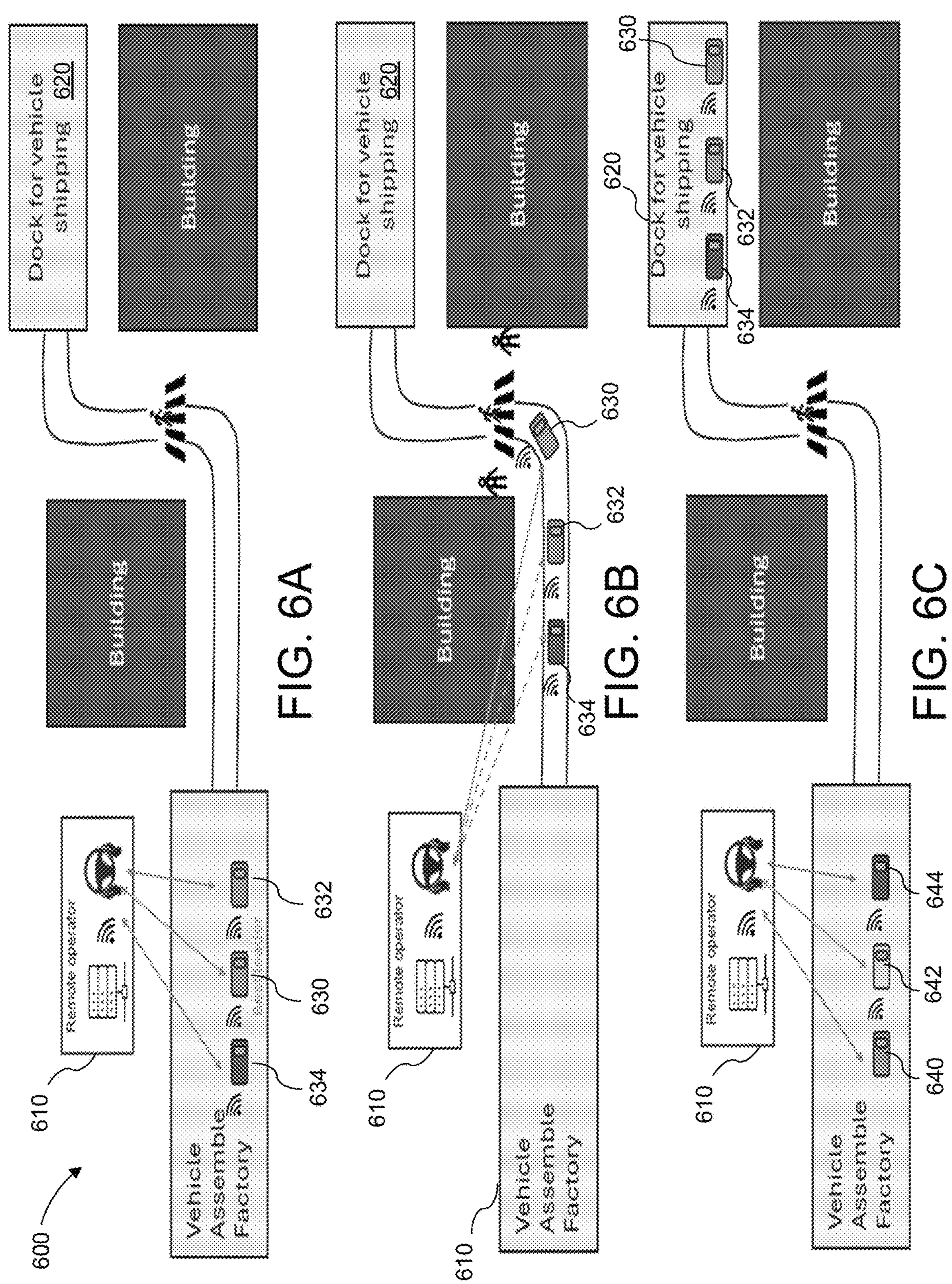
FIGS. 6A-6C illustrate example diagrams of platoon formation, according to example applications described in the present disclosure.

FIGS. 6A-6C illustrate example diagrams of platoon formation using a platoon formation system 600. A platoon formation system 600 may include a remote operator 610 that may be used to communicate with one or more vehicles that are in a platoon, such as, for example, vehicles 630, 632 and 634. Each vehicle 630, 632 and 634 in the platoon may include, for example, an automobile, truck, motorcycle, bicycle, scooter, moped, recreational vehicle and other like on- or off-road vehicles. Each vehicle 630, 632 and 634 may include, for example, an autonomous, semi-autonomous and manual operation.

Each vehicle 630, 632 and 634 may include one or more sensors that may be used to collect sensor data and map data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received from at least one sensor of a vehicle. The sensor data of a vehicle may include information on the condition of the road, damages to the road, hazardous features on the road, attributes of the road (i.e., the color, size, type and shape of lane markers, number of lanes, etc.), types of lanes (i.e., high occupancy lanes, merging lanes, exiting lanes, passing lanes, slow lanes, turning lanes, etc.), environmental conditions, lane markers and markings within the lane, map, location, traffic, speed, direction, and objects on, proximate to, and associated with the road that is collected by the respective vehicle. An object on the road may include a pothole, crack, tire marking, faded road marking, debris, occlusion, road reflection, flooding, ice, fire, oil leak, uneven pavement, erosion, raveling, sign, pole, building, structure, pedestrian, animal, and vehicle. The environmental condition may include location, coordinates, population, landscape, landmark, terrain, territory, weather, temperature, humidity, pollution, habitat, and other environmental surroundings on, proximate to, or associated with the road that the respective vehicle is traveling on.

Each vehicle 630, 632 and 634 may collect map data of the road that the respective vehicle is traveling on. The map data, which may be stored onboard the vehicle or obtained from the cloud or other infrastructure element, may include location, coordinates, population, landscape, landmark, terrain, territory, weather, temperature, humidity, pollution, habitat, and other environmental surroundings on, proximate to, and associated with the road that the respective vehicle is traveling on. The map data, sensor data or both may be analyzed to determine a position of the respective vehicle on the road.

Each vehicle 630, 632 and 634 may generate and send a platoon formation message to the remote operator 610 of the platoon formation system 600. The platoon formation message may be a message presenting a vehicle's intention to seek to join a platoon of vehicles. The platoon formation message of a vehicle may include a location of the respective vehicle (i.e., information associated with the precise position of the respective vehicle on the road it is traversing on), destination of the respective vehicle (i.e., information associated with the precise position of the destination that the respective vehicle is traveling to reach), driving preference of the respective vehicle (i.e., information associated with the preference of the driver of the respective vehicle, including, for example, an average speed of travel, maximum speed of travel, maximum number of vehicles in a platoon, etc.), and one or more vehicular capabilities of the respective vehicles (i.e., latency, longitudinal stability, lateral deviation, communication, driving performance, etc.). Each vehicle 630, 632 and 634 may use one or more sensors to determine its location, destination, driving preference, and vehicular capabilities. Each vehicle 630, 632 and 634 may use one or more forms of communication to send the platoon formation message to the remote operator 610 of the platoon formation system 600.

The remote operator 610 of the platoon formation system 600 may receive platoon formation messages from numerous vehicles. The platoon formation system 600 may analyze the received platoon formation messages to determine a plurality of vehicles that are in a same location or locations in close proximity of each other, such as, for example, vehicles 630, 632, and 634. The location of a vehicle may include information associated with the precise position of the respective vehicle on the road it is traversing on. The location of a vehicle may be determined according to a GPS of the respective vehicle. The platoon formation system 600 may identify such one or more vehicles at one or more locations at or below a distance threshold of each other by analyzing the platoon formation message of each of the one or more vehicles. The distance threshold may be a maximum distance between a set location, such as the location of the vehicle 630, and the location of another vehicle, such as the location of vehicle 632 or 634. The distance threshold may be a preset value. The distance threshold may vary according to one or more factors, including, for example, time of day, day of week, set location, type of road, traffic on the road, road conditions, environmental conditions, etc. The distance threshold may vary according to conditions and features of the road as determined from sensor data of one or more vehicles, including, for example, vehicles 630, 632 and 634. The distance threshold may be updated according to algorithms and models using driving data of vehicles. Many variations are possible.

The platoon formation system 600 may determine a plurality of vehicles in the same location or close proximity of each other, such as vehicles 630, 632 and 634, that are traveling to a same destination or destinations in close proximity of each other, such as destination 620. The destination 620 of the vehicles 630, 632 and 634 may include information associated with the precise position of the destination 620 that the vehicles 630, 632 and 634 are traveling to reach as its final destination. The destination 620 of the vehicles 630, 632 and 634 may be determined according to a GPS of the vehicles 630, 632 and 634. The platoon formation system 600 may determine which vehicles of a plurality of vehicles has a destination of travel that is at or below a destination threshold of a set destination, such as, for example, the destination of the vehicle 630. The destination threshold may be a maximum distance between the set destination and the destination of another vehicle, such as vehicle 632 and 634. The destination threshold may be a maximum distance between the set destination and the route of travel of the another vehicle to the destination of the another vehicle, and vice versa. Many variations are possible. The destination threshold may be a preset value. The destination threshold may vary according to one or more factors, including, for example, time of day, day of week, set destination, type of road being traveled on, route of travel, traffic on the road, road conditions, environmental conditions, etc. The destination threshold may vary according to conditions and features of the road as determined from sensor data of one or more vehicles, including, for example, the ego vehicle. The destination threshold may be updated according to algorithms and models using driving data of vehicles. Many variations are possible. The platoon formation system 600 may group these plurality of vehicles together to potentially form one or more platoons of vehicles.

Upon determining a plurality of vehicles that are in the same location (or location in close proximity of each other) and that are traveling to a same destination (or destinations in close proximity of each other), the platoon formation system 600 may further analyze the platoon formation messages from the plurality of vehicles to determine the latency vehicular capability of each of the plurality of vehicles. Each platoon formation message of the plurality of vehicles may include a latency vehicular capability of a respective vehicle that represents the amount of time needed for data to pass from the respective vehicle to a communication network.

The platoon formation system 600 may determine which of the plurality of vehicles has a latency vehicular capability that is at or below a teleoperated driving (ToD) threshold. The ToD threshold may be an overall latency allowed for a platoon of vehicles. The ToD threshold may be set according to a communication network being used by the platoon formation system 600 to communicate to each vehicle in a platoon. The ToD threshold may be set according to one or more communication channels available for use in a communication network used by the platoon formation system 600 to communicate to each vehicle in a platoon. The ToD threshold may be a preset value. The ToD threshold may vary according to one or more factors, including, for example, time of day, day of week, location of the plurality of vehicles, bandwidth of the communication network, network traffic, number of devices on the communication network, network latency, environmental conditions, etc. The ToD threshold may be updated according to algorithms and models using data on communication networks and channels for vehicle communication. Many variations are possible.

Any and all of the plurality of vehicles that have a latency vehicular capability that is at or below a ToD threshold may be grouped in a subset. The platoon formation system 600 may determine that the vehicles 630, 632 and 634 all have a respective latency vehicular capability that is at or below the ToD threshold for the communication network available for them. The platoon formation system 600 may determine which vehicle in the subset has a lowest value of latency vehicular capability. The platoon formation system may label the vehicle with the lowest value of latency vehicular capability as a lead vehicle for a platoon. As demonstrated in FIG. 6A, the platoon formation system 600 may determine vehicle 630 to have the lowest value of latency vehicular capability and deem vehicle 630 as the best leader for a platoon. As such, the platoon formation system 600 may label vehicle 630 as the lead vehicle.

The platoon formation system 600 may determine whether the remaining vehicles of 632 and 634 may be able to join a platoon with the lead vehicle 630 as follow vehicles. A vehicle may be labeled as a follow vehicle when it includes a one or more vehicular capabilities that collectively meet requirements for a follow vehicle in a platoon. The one or more vehicular capabilities of a vehicle that are considered to determine whether such vehicle can be labeled as a follow vehicle include latency, longitudinal stability, lateral stability, lateral deviation, communication, and driving performance (i.e., capabilities of the vehicle that affect its ability to be driven, including steering, braking, acceleration, deceleration, throttle, etc.).

The requirements for a follow vehicle may be set as a platoon following threshold that a vehicle may have to meet to be able to join a platoon as a following vehicle. The platoon following threshold may be a preset value. The platoon following threshold may vary according to one or more factors, including, for example, time of day, day of week, location of the plurality of vehicles, destination of travel, lead vehicle, type of road being traveled on, route of travel, traffic on the road, road conditions, environmental conditions, etc. The platoon following threshold may be updated according to algorithms and models using data on platooning. Many variations are possible. The platoon formation system 600 may label one or more vehicles in the subset as a follow vehicle for the platoon with the lead vehicle 630. As demonstrated in FIG. 6A, the platoon formation system 600 may determine that vehicles 632 and 634 qualify to be follow vehicles to join the platoon with the lead vehicle 630.

After determining the lead vehicle 630 and the follow vehicles 632 and 634 for a platoon, the platoon formation system 600 may have the lead vehicle 630 and the follow vehicles 632 and 634 form the platoon. To establish a platoon between the lead vehicle 630 and the follow vehicles 632 and 634, the platoon formation system 60 may generate a platoon formation strategy to be sent to each of the vehicles 630, 632 and 634. The platoon formation strategy may include instructions for each vehicle 630, 632 and 634 to execute to establish a platoon. The platoon formation system 600 may send the platoon formation strategy to each vehicle 630, 632 and 634 through the remote operator 610. Each vehicle 630, 632 and 634 determined to form a platoon may execute instructions from the platoon formation strategy to establish the platoon. Each vehicle 630, 632 and 634 may have its own set of instructions to execute to efficiently and effectively form the platoon.

Each vehicle 630, 632 and 634 may be assigned a particular position in the platoon, such as, for example, a lead position, following position, middle position, end position, first position, second position, third position, etc. The position assigned to the lead vehicle 630 may be the first, lead position in the platoon. The position assigned to each of the follow vehicles 632 and 634 may be assigned at random by the platoon formation system 600. The position assigned to each follow vehicle 632 and 634 may be based on one or more factors, including, for example, driving preference of each follow vehicle, location of each follow vehicle, destination of each follow vehicle, vehicular capabilities of each follow vehicle, traffic, route of travel, environmental conditions, etc. The driving preference of a vehicle may include information associated with the preference of the driver of the vehicle, including, for example, an average speed of travel, maximum speed of travel, position in a platoon that the driver of the vehicle is comfortable with being at, etc. As demonstrated in FIG. 6B, the platoon formation system 600 may position the vehicles 630, 632 and 634 in order of lead vehicle 630, followed by follow vehicle 632 and followed by follow vehicle 634.

Upon forming the platoon between the lead vehicle 630 and the follow vehicles 632 and 634, the platoon formation system 600 may link one or more communication channels of each of the vehicles 630, 632 and 634. By linking one or more communication channels of the lead and follow vehicles 630, 632 and 634, each vehicle in the platoon may be able to communicate with one another. Each of the lead and follow vehicles 630, 632 and 634 in the platoon may be able to send messages and data to one another using the linked communication channel(s). Each vehicle 630, 632 and 634 may have its own sensor data. The sensor data of each vehicle may include a direction, speed, driving pattern, location, road condition, map, location, traffic, object, and environmental condition that the respective vehicle encounters while traveling on the road. Each vehicle 630, 632 and 634 in the platoon may have one or more sensors capable of collecting data of the road and the driving performance of the respective vehicle. One or more sensors, either individually or in combination, may be able to collect data on the road, such as sensor data, to determine conditions and features of the road. The one or more sensors, either individually or in combination, may be able to collect data on the driving performance of the respective vehicle to determine the driving pattern of the respective vehicle on the road. The one or more sensors of the vehicle used to collect data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

Upon forming the platoon with the lead and follow vehicles 630, 632 and 634, the platoon formation system 600 may deactivate one or more sensors of each follow vehicle 632 and 634. By deactivating the one or more sensors of each follow vehicle 632 and 634, each follow vehicle 632 and 634 may be unable to collect data relative to the road, vehicles, traffic, environment, and driving performance of the respective vehicle. The platoon formation system 600 may deactivate limit the one or more sensors of each follow vehicle 632 and 634 to limit the use of the one or more sensors, such as deactivating (or restricting) the video streaming capabilities of the follow vehicles 632 and 634. Deactivating the video streaming capabilities of a vehicle may prevent the vehicle from collecting and transmitting video data that the vehicle may be able to obtain using one or more sensors. By deactivating one or more sensors and data collecting capabilities of a follow vehicle in a platoon, the platoon formation system 600 may be able to reduce the amount of bandwidth being used in a communication network, which may reduce the amount of latency needed for vehicles in a platoon to communicate to each other to navigate and travel via platooning. Reducing the amount of bandwidth and latency that may be necessary for a platoon of vehicles to communicate between may improve the accuracy and efficiency in platooning vehicles.

While the platoon formation system 600 may deactivate one or more sensors and data collecting capabilities of the follow vehicles 632 and 634, the platoon formation system 600 may allow the lead vehicle 630 to have all of its sensors active and collect data relative to all aspects of the road, vehicles, traffic, environment, and driving performance of the lead vehicle 630 and each of the follow vehicles 632 and 634. The platoon formation system 600 may use the data collected by the one or more sensors of the lead vehicle 630 to generate a platoon route for the platoon. The data collected by the lead vehicle 630 may include video streaming data that is collected using one or more sensors that visually display information relative to the road, surrounding vehicles, traffic, environment, and driving performance of the lead vehicle 630 and each of the follow vehicles 632 and 634.

The platoon formation system 600 may generate the platoon route to include a route for each vehicle 630, 632 and 634 in the platoon to follow to reach the destination 620. The platoon route may be generated according to one or more factors, including, for example, time of day, day of week, destination 620, type of road the platoon of vehicles is traveling on, traffic on the road, road conditions, environmental conditions, safety, energy efficiency, road capacity, comfort, etc. The platoon formation system 600 may update the platoon route according to changes in the one or more factors, such as, for example, pedestrians walking across a street, as shown in FIG. 6B. The platoon formation system 600 may send the platoon route to each vehicle 630, 632 and 634 in the platoon.

After a platoon of vehicles is formed, the platoon of vehicles 630, 632 and 634 may travel on the road according to the platoon route generated by the platoon formation system 600 using data obtained by the lead vehicle 630. As the platoon of vehicles is traveling to the destination 620, the platoon formation system 600 may determine if the data obtained by the lead vehicle 630 is adequate to accurately and efficiently generate a platoon route for the platoon of vehicles to follow. Upon a determination that the data obtained by the lead vehicle 630 is insufficient, the platoon formation system 600 may reactivate one or more sensors of one or more follow vehicles to collect additional data relative to the road, vehicles, traffic, environment, and driving performance of the lead vehicle 630 and each of the follow vehicles 632 and 634. The platoon formation system 600 may collectively use the data obtained by the lead vehicle 630 and the data obtained by the one or more follow vehicles 632 and 634 to generate the platoon route for the platoon of vehicles to follow. The platoon formation system 600 may choose which one or more sensors of which one or more follow vehicles 632 and 634 to activate according to the availability of resources in the communication network. The platoon formation system 600 may monitor the amount of data being collected by the lead vehicle 630 and one or more follow vehicles 632 and 634 to deactivate sensors accordingly to prevent the amount of data being transmitted from exceeding an overload limit. By keeping the amount of data being transmitted within an overload limit, the platoon formation system 600 may decrease the amount of congestion on the communication network used by the platoon of vehicles while increasing the accuracy and efficiency in platooning vehicles. Many variations are possible.

As demonstrated in FIG. 6C, the platoon formation system 600 may disassemble the platoon of vehicles 630, 632 and 634 upon reaching the destination 620. Disassembling the platoon of vehicles 630, 632 and 634 may include disconnecting the communication channels of each vehicle 630, 632 and 634 in the platoon. Disassembling the platoon of vehicles 630, 632 and 634 may include reactivating one or more sensors of the follow vehicles 632 and 634 that may have been previously deactivated during platooning.

As demonstrated in FIG. 6C, the platoon formation system 600 may determine a new set of vehicles to form a platoon, such as vehicles 640, 642 and 644, after the previous platoon of vehicles 630, 632 and 634 have reached the destination 620 and disassembled. The platoon formation system 600 may proceed with each step as discussed above to form a new platoon of vehicles 640, 642 and 644 and generate a new platoon route to navigate the new platoon of vehicles 640, 642 and 644 to a new destination. The platoon formation system 600 may form platoon of vehicles consequently and/or simultaneously depending on the availability of resources in the communication network to receive and transmit data between each vehicle in a platoon for the one or more platoons. The availability of resources in the communication network may be based on the overall latency, bandwidth, network traffic, number of devices and vehicles, quality of data, type of communication packets, etc. that are being processed and transmitted through the communication network.

Vehicles in one or more platoons, such as vehicles 630, 632, 634, 640, 642 and 644, may perform intent sharing by P2P (peer-to-peer), V2V (vehicle-to-vehicle), V2X (vehicle-to-everything), or other communication protocols. Vehicles 630, 632, 634, 640, 642 and 644 in one or more platoons may exchange their anticipated future trajectories to each other using information of position, speed, and time.

FIG. 7 illustrates an example computing component 700 that includes one or more hardware processors 702 and machine-readable storage media 704 storing a set of machine-readable/machine-executable instructions that, when executed, cause the hardware processor(s) 702 to perform an illustrative method of platoon formation. It should be appreciated that there can be additional, fewer, or alternative steps performed in similar or alternative orders, or in parallel, within the scope of the various examples discussed herein unless otherwise stated. The computing component 700 may be implemented as the computing component 110 of FIG. 1, the computing system 210 of FIG. 2, the platoon formation system 300 of FIG. 3, the process 400 of FIG. 4, the platoon formation system 600 of FIGS. 6A-6C and the computing component 800 of FIG. 8.

At step 706, the hardware processor(s) 702 may execute machine-readable/machine-executable instructions stored in the machine-readable storage media 704 to determine a plurality of vehicles traveling to a destination. An ego vehicle may be traveling on a road. The ego vehicle may collect sensor data of the road upon which the ego vehicle is traveling. The ego vehicle may include, for example, an automobile, truck, motorcycle, bicycle, scooter, moped, recreational vehicle and other like on- or off-road vehicles. The ego vehicle may include, for example, an autonomous, semi-autonomous and manual operation.

The ego vehicle may include one or more sensors that may be used to collect sensor data and map data of the road. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). Data may be received from at least one sensor of the ego vehicle. The sensor data may include information on the condition of the road, damages to the road, hazardous features on the road, attributes of the road (i.e., the color, size, type and shape of lane markers, number of lanes, etc.), types of lanes (i.e., high occupancy lanes, merging lanes, exiting lanes, passing lanes, slow lanes, turning lanes, etc.), environmental conditions, lane markers and markings within the lane, map, location, traffic, speed, direction, and objects on, proximate to, and associated with the road that is collected by the ego vehicle. An object on the road may include a pothole, crack, tire marking, faded road marking, debris, occlusion, road reflection, flooding, ice, fire, oil leak, uneven pavement, erosion, raveling, sign, pole, building, coordinates, population, landscape, landmark, terrain, territory, weather, temperature, humidity, pollution, habitat, and other environmental surroundings on, proximate to, or associated with the road that the ego vehicle is traveling on.

The ego vehicle may collect map data of the road that the ego vehicle is traveling on. The map data, which may be stored onboard the vehicle or obtained from the cloud or other infrastructure element, may include location, coordinates, population, landscape, landmark, terrain, territory, weather, temperature, humidity, pollution, habitat, and other environmental surroundings on, proximate to, and associated with the road that the ego vehicle is traveling on. The map data, sensor data or both may be analyzed to determine a position of the ego vehicle on the road.

The ego vehicle may generate and send a platoon formation message to a platoon formation system. The platoon formation message may be a message presenting the ego vehicle's intention to seek to join a platoon of vehicles. The platoon formation message of the ego vehicle may include a location of the ego vehicle (i.e., information associated with the precise position of the ego vehicle on the road it is traversing on), destination of the ego vehicle (i.e., information associated with the precise position of the destination that the ego vehicle is traveling to reach), driving preference of the ego vehicle (i.e., information associated with the preference of the driver of the ego vehicle, including, for example, an average speed of travel, maximum speed of travel, maximum number of vehicles in a platoon, etc.), and one or more vehicular capabilities of the ego vehicles (i.e., latency, longitudinal stability, lateral deviation, communication, driving performance, etc.). The ego vehicle may use one or more sensors to determine its location, destination, driving preference, and vehicular capabilities. The ego vehicle may use one or more forms of communication to send the platoon formation message to the platoon formation system.

The platoon formation system may receive platoon formation messages from numerous vehicles. The platoon formation system may analyze the received platoon formation messages to determine a plurality of vehicles that are in a same location or locations in close proximity of each other. The location of the ego vehicle may include information associated with the precise position of the ego vehicle on the road it is traversing on. The location of the ego vehicle may be determined according to a GPS of the ego vehicle. The platoon formation system may identify such one or more vehicles at one or more locations within a distance threshold of each other by analyzing the platoon formation message of each of the one or more vehicles. The distance threshold may be a maximum distance between a set location, such as the location of the ego vehicle, and the location of another vehicle. The distance threshold may be a preset value. The distance threshold may vary according to one or more factors, including, for example, time of day, day of week, set location, type of road, traffic on the road, road conditions, environmental conditions, etc. The distance threshold may vary according to conditions and features of the road as determined from sensor data of one or more vehicles, including, for example, the ego vehicle. The distance threshold may be updated according to algorithms and models using driving data of vehicles. Many variations are possible.

The platoon formation system may determine a plurality of vehicles in the same location or close proximity of each other that are traveling to a same destination or destinations in close proximity of each other. The destination of the ego vehicle may include information associated with the precise position of the destination that the ego vehicle is traveling to reach as its final destination. The destination of the ego vehicle may be determined according to a GPS of the ego vehicle. The platoon formation system may determine which vehicles of the plurality of vehicles has a destination of travel that is within a destination threshold of a set destination, such as, for example, the destination of the ego vehicle. The destination threshold may be a maximum distance between the set destination and the destination of another vehicle. The destination threshold may be a maximum distance between the set destination and the route of travel of the another vehicle to the destination of the another vehicle, and vice versa. Many variations are possible. The destination threshold may be a preset value. The destination threshold may vary according to one or more factors, including, for example, time of day, day of week, set destination, type of road being traveled on, route of travel, traffic on the road, road conditions, environmental conditions, etc. The destination threshold may vary according to conditions and features of the road as determined from sensor data of one or more vehicles, including, for example, the ego vehicle. The destination threshold may be updated according to algorithms and models using driving data of vehicles. Many variations are possible. The platoon formation system may group these plurality of vehicles together to potentially form one or more platoons of vehicles.

At step 708, the hardware processor(s) 702 may execute machine-readable/machine-executable instructions stored in the machine-readable storage media 704 to determine a subset of vehicles from the plurality of vehicles that each have a latency within a teleoperated driving (ToD) threshold. Upon determining a plurality of vehicles that are in the same location (or location in close proximity of each other) and that are traveling to a same destination (or destinations in close proximity of each other), the platoon formation system may further analyze the platoon formation messages from the plurality of vehicles to determine the latency vehicular capability of each of the plurality of vehicles. Each platoon formation message of the plurality of vehicles may include a latency vehicular capability of a respective vehicle that represents the amount of time needed for data to pass from the respective vehicle to a communication network.

The platoon formation system may determine which of the plurality of vehicles has a latency vehicular capability that is within a teleoperated driving (ToD) threshold. The ToD threshold may be an overall latency allowed for a platoon of vehicles. The ToD threshold may be set according to a communication network being used by the platoon formation system to communicate to each vehicle in a platoon. The ToD threshold may be set according to one or more communication channels available for use in a communication network used by the platoon formation system to communicate to each vehicle in a platoon. The ToD threshold may be a preset value. The ToD threshold may vary according to one or more factors, including, for example, time of day, day of week, location of the plurality of vehicles, bandwidth of the communication network, network traffic, number of devices on the communication network, network latency, environmental conditions, etc. The ToD threshold may be updated according to algorithms and models using data on communication networks and channels for vehicle communication. Many variations are possible. Any and all of the plurality of vehicles that have a latency vehicular capability that is within a ToD threshold may be grouped in a subset.

At step 710, the hardware processor(s) 702 may execute machine-readable/machine-executable instructions stored in the machine-readable storage media 704 to determine a lead vehicle for a platoon from the subset of vehicles. The platoon formation system may determine a subset of vehicles from the plurality of vehicles that have a latency vehicular capability that is within the ToD threshold. Each vehicle in the subset may have its own value of latency vehicular capability. The platoon formation system may determine which vehicle in the subset has a lowest value of latency vehicular capability. The platoon formation system may label the vehicle with the lowest value of latency vehicular capability as a lead vehicle for a platoon.

At step 712, the hardware processor(s) 702 may execute machine-readable/machine-executable instructions stored in the machine-readable storage media 704 to determine a follow vehicle for the platoon from the subset of vehicles. The platoon formation system may determine, from the subset of vehicles that have a latency vehicular capability that is within the ToD threshold, one or more follow vehicles to join the platoon with the chosen lead vehicle. A vehicle from the subset of vehicles may be labeled as a follow vehicle when it includes a one or more vehicular capabilities that collectively meet requirements for a follow vehicle in a platoon. The one or more vehicular capabilities of a vehicle that are considered to determine whether such vehicle can be labeled as a follow vehicle include longitudinal stability, lateral stability, lateral deviation, communication, and driving performance (i.e., capabilities of the vehicle that affect its ability to be driven, including steering, braking, acceleration, deceleration, throttle, etc.).

The requirements for a follow vehicle may be set as a platoon following threshold that a vehicle may have to meet to be able to join a platoon as a following vehicle. The platoon following threshold may be a preset value. The platoon following threshold may vary according to one or more factors, including, for example, time of day, day of week, location of the plurality of vehicles, destination of travel, lead vehicle, type of road being traveled on, route of travel, traffic on the road, road conditions, environmental conditions, etc. The platoon following threshold may be updated according to algorithms and models using data on platooning. Many variations are possible. The platoon formation system may label one or more vehicles in the subset as a follow vehicle for the platoon with the lead vehicle.

At step 714, the hardware processor(s) 702 may execute machine-readable/machine-executable instructions stored in the machine-readable storage media 704 to form a platoon between the lead vehicle and the one or more follow vehicles. After determining the lead vehicle and the one or more follow vehicles for a platoon, the platoon formation system may have the lead vehicle and the one or more follow vehicles form the platoon. To establish a platoon between the lead vehicle and one or more follow vehicles, the platoon formation system may generate a platoon formation strategy. The platoon formation strategy may include instructions for each vehicle to execute to establish a platoon. The platoon formation system may send the platoon formation strategy to each vehicle involved in forming a platoon. Each vehicle determined to form a platoon may execute instructions from the platoon formation strategy to establish the platoon. Each vehicle may have its own set of instructions to execute to efficiently and effectively form the platoon.

Each vehicle may be assigned a particular position in the platoon, such as, for example, a lead position, following position, middle position, end position, first position, second position, third position, etc. The position assigned to the lead vehicle may be the first, lead position in the platoon. The position assigned to each of the follow vehicles may be assigned at random by the platoon formation system. The position assigned to each follow vehicle may be based on one or more factors, including, for example, driving preference of each follow vehicle, location of each follow vehicle, destination of each follow vehicle, vehicular capabilities of each follow vehicle, traffic, route of travel, environmental conditions, etc. The driving preference of a vehicle may include information associated with the preference of the driver of the vehicle, including, for example, an average speed of travel, maximum speed of travel, position in a platoon that the driver of the vehicle is comfortable with being at, etc.

Upon forming the platoon between the lead vehicle and the one or more follow vehicles, the platoon formation system may link one or more communication channels of each of the lead and follow vehicles. By linking one or more communication channels of the lead and follow vehicles, each vehicle in the platoon may be able to communicate with one another. Each of the lead and follow vehicles in the platoon may be able to send messages and data to one another using the linked communication channel(s). Each vehicle may have its own sensor data. The sensor data of each vehicle may include a direction, speed, driving pattern, location, road condition, map, location, traffic, object, and environmental condition that the respective vehicle encounters while traveling on the road. Each vehicle in the platoon may have one or more sensors capable of collecting data of the road and the driving performance of the respective vehicle. One or more sensors, either individually or in combination, may be able to collect data on the road, such as sensor data, to determine conditions and features of the road. The one or more sensors, either individually or in combination, may be able to collect data on the driving performance of the respective vehicle to determine the driving pattern of the respective vehicle on the road. The one or more sensors of the vehicle used to collect data may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

At step 716, the hardware processor(s) 702 may execute machine-readable/machine-executable instructions stored in the machine-readable storage media 704 to deactivate video streaming of the one or more follow vehicles. Upon forming the platoon with the lead and one or more follow vehicles, the platoon formation system may deactivate one or more sensors of each follow vehicle. By deactivating the one or more sensors of each follow vehicle, each follow vehicle may be unable to collect data relative to the road, vehicles, traffic, environment, and driving performance of the respective vehicle. The platoon formation system may deactivate the one or more sensors of each follow vehicle to limit the use of the one or more sensors, such as deactivating (or restricting) the video streaming capabilities of the one or more follow vehicles. Deactivating the video streaming capabilities of a vehicle may prevent the vehicle from collecting and transmitting video data that the vehicle may be able to obtain using one or more sensors. By deactivating one or more sensors and data collecting capabilities of a follow vehicle in a platoon, the platoon formation system may be able to reduce the amount of bandwidth being used in a communication network, which may reduce the amount of latency needed for vehicles in a platoon to communicate to each other to navigate and travel via platooning. Reducing the amount of bandwidth and latency that may be necessary for a platoon of vehicles to communicate between may improve the accuracy and efficiency in platooning vehicles.

At step 718, the hardware processor(s) 702 may execute machine-readable/machine-executable instructions stored in the machine-readable storage media 704 to generate a platoon route for the platoon. While the platoon formation system may deactivate one or more sensors and data collecting capabilities of the one or more follow vehicles, the platoon formation system may allow the lead vehicle to have all of its sensors active and collect data relative to all aspects of the road, vehicles, traffic, environment, and driving performance of the lead vehicle and each of the follow vehicles. The platoon formation system may use the data collected by the one or more sensors of the lead vehicle to generate a platoon route for the platoon. The data collected by the lead vehicle may include video streaming data that is collected using one or more sensors that visually display information relative to the road, surrounding vehicles, traffic, environment, and driving performance of the lead vehicle and each of the follow vehicles.

The platoon formation system may generate the platoon route to include a route for each vehicle in the platoon to follow to reach at least one destination of the vehicles in the platoon. The platoon route may be generated according to one or more factors, including, for example, time of day, day of week, destination of one or more vehicles in the platoon, type of road the platoon of vehicles is traveling on, traffic on the road, road conditions, environmental conditions, safety, energy efficiency, road capacity, comfort, capabilities of each vehicle in the platoon, etc. The safety factor may be associated with a minimum amount of safety conditions that the vehicles in a platoon may have to follow when traveling as a platoon, including, for example, a minimum distance of space between each vehicle in the platoon based on the speed of the platoon, maximum speed of travel allowed by each vehicle in the platoon, minimum distance of space between the lead vehicle of the platoon and the vehicle in front of the platoon, etc. The energy efficiency factor may be associated with an amount of energy that each vehicle in the platoon may need to conserve when traveling in the platoon. The road capacity factor may be associated with a number of vehicles on the road and near the location of the platoon of vehicles. The comfort factor may be associated with at least one of driving preferences of each driver of each vehicle in the platoon, capabilities of each vehicle in the platoon, road conditions, environmental conditions, traffic, etc. Each factor considered in generating the platoon route may be based on capabilities of each vehicle in the platoon, the location of the platoon of vehicles, characteristics of the road, environmental conditions, etc. The platoon formation system may update the platoon route according to changes in the one or more factors. The platoon formation system may send the platoon route to each vehicle in the platoon.

After a platoon of vehicles is formed, the platoon of vehicles may travel on the road according to the platoon route generated by the platoon formation system using data obtained by the lead vehicle. As the platoon of vehicles is traveling to a destination, the platoon formation system may determine if the data obtained by the lead vehicle is adequate to accurately and efficiently generate a platoon route for the platoon of vehicles to follow. Upon a determination that the data obtained by the lead vehicle is insufficient, the platoon formation system may reactivate one or more sensors of one or more follow vehicles to collect additional data relative to the road, vehicles, traffic, environment, and driving performance of the lead vehicle and each of the follow vehicles. The platoon formation system may collectively use the data obtained by the lead vehicle and the data obtained by the one or more follow vehicles to generate the platoon route for the platoon of vehicles to follow. The platoon formation system may choose which one or more sensors of which one or more follow vehicles to activate according to the availability of resources in the communication network. The platoon formation system may monitor the amount of data being collected by the lead vehicle and one or more follow vehicles to deactivate sensors accordingly to prevent the amount of data being transmitted from exceeding an overload limit. By keeping the amount of data being transmitted within an overload limit, the platoon formation system may decrease the amount of congestion on the communication network used by the platoon of vehicles while increasing the accuracy and efficiency in platooning vehicles. Many variations are possible.

A vehicle in a platoon may disengage from the platoon for a variety of reasons, including, for example, when the vehicle reaches a point in the platoon route where it needs to disengage and separate itself to reach its respective destination, when the vehicle has to make a stop (e.g., to refill gas, recharge vehicle battery, purchase food, use restroom, take rest stop, fix vehicle, buy medicine, etc.), when the driver of the vehicle chooses to no longer be in the platoon, and when the platoon has reached its final destination. A vehicle in a platoon may disengage from the platoon by sending a platoon disengage message to the platoon formation system. The platoon formation system may disengage a vehicle from a platoon by sending instructions to the vehicle for disengaging from the platoon. The platoon formation system may disengage a vehicle from a platoon without first receiving a platoon disengage message, when the platoon formation system determines that the vehicle needs to be disengaged from the platoon based on the platoon formation message of the respective vehicle. Many variations are possible.

When a vehicle in a platoon is determined to be disengaged from the platoon, the platoon formation system may send instructions to the disengaging vehicle to disengage from the platoon formation. The platoon formation system may generate an updated platoon formation strategy for each remaining vehicle in the platoon and send the updated platoon formation strategy to each remaining vehicle. Each remaining vehicle may execute the updated platoon formation strategy to establish an updated platoon formation upon the separation of the disengaged vehicle. In one example, if the third vehicle in a four vehicle platoon is determined to disengage from the platoon, an updated platoon formation strategy may be provided to have the remaining vehicles establish an updated platoon formation where the fourth vehicle will now move closer to the second vehicle and take the place of the disengaged third vehicle. The updated platoon formation may now consist of only the remaining three vehicles. In another example, if the first vehicle in a four vehicle platoon is determined to disengage from the platoon, an updated platoon formation strategy may be provided to have the remaining vehicles establish an updated platoon formation where the follow vehicle with the lowest latency vehicular capability becomes the lead vehicle of the platoon and takes the place of the disengaged first vehicle. The updated platoon formation may now consist of only the remaining three vehicles. Once the remaining vehicles have established the updated platoon formation, the updated platoon may continue traveling on the road according to the platoon route provided by the platoon formation system.

When a vehicle in a platoon is determined to be disengaged from the platoon, the platoon formation system may disconnect the communication channel(s) of the respective vehicle from the other vehicles in the platoon. The platoon formation system may reactivate any of the one or more sensors of the disengaged vehicle that may have been previously deactivated. Upon reaching the final destination of the platoon, the platoon formation system may disassemble the platoon of vehicles. Disassembling the platoon of vehicles may include disconnecting the communication channels of each vehicle in the platoon. Disassembling the platoon of vehicles may include reactivating one or more sensors of one or more follow vehicles that may have been previously deactivated during platooning.

Each of the vehicles in a platoon may communicate to one another and to the platoon formation system using a P2P (peer-to-peer), V2V or other communication protocol. A platoon of vehicles may move together according to a navigation strategy (i.e., a platoon route) to travel efficiently, effectively, and safely navigate the platoon of vehicles on a road.

Monitoring data of various vehicles traveling on a road may permit up-to-date navigation information and road conditions, that may be analyzed to efficiently and accurately identify compatible vehicles for platoon formation and navigate a platoon of vehicles on a road. The efficient and accurate determination of compatible vehicles may improve the efficiency, effectiveness, and safety of forming platoons of vehicles and in the navigation of platoons of vehicles traveling on the road. Efficiently, effectively, and safely controlling platooning may further increase the avoidance of incidents and accidents occurring on the road.

Figure 8:
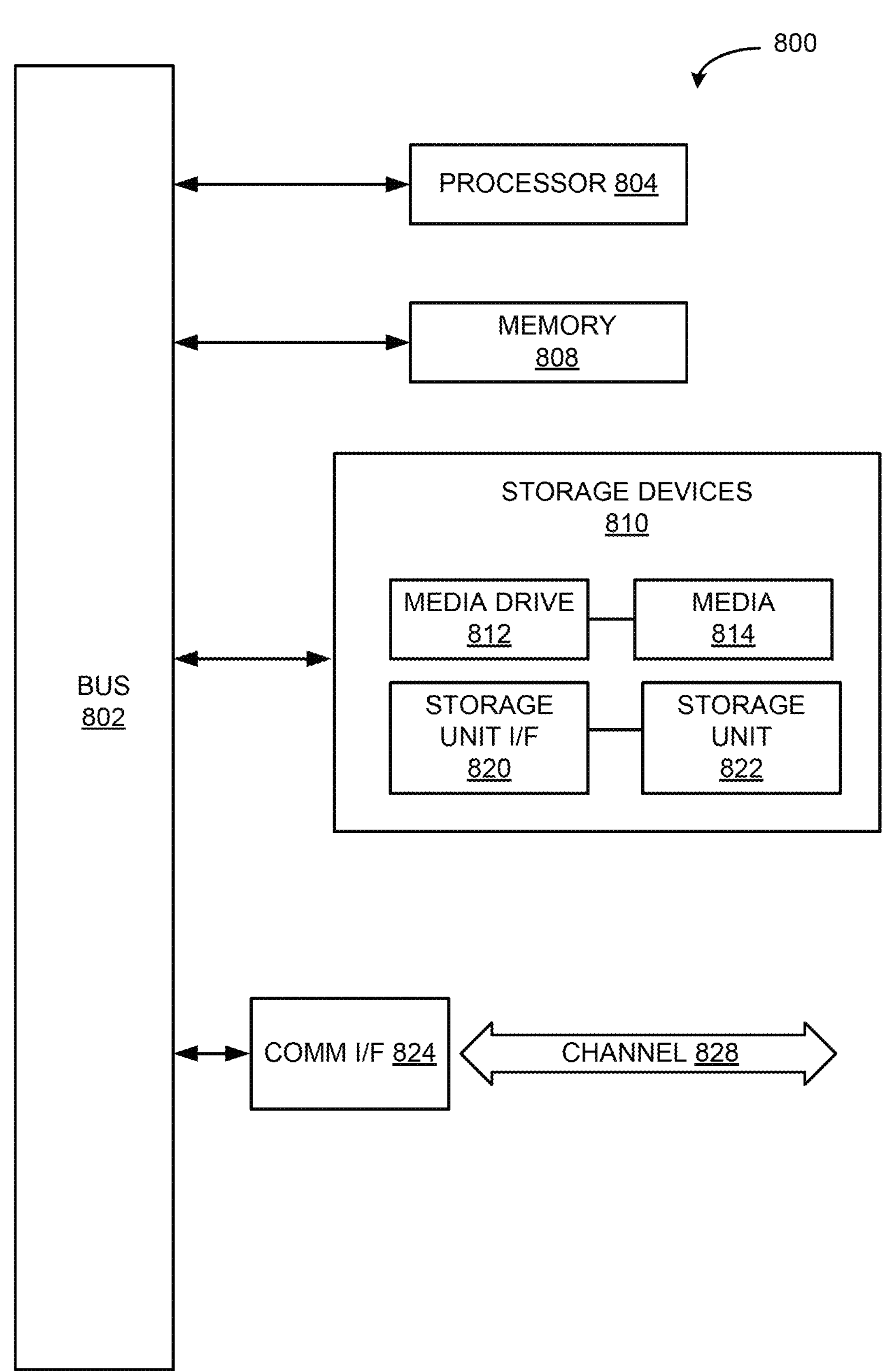
FIG. 8 is an illustration of an example computing component that may be used to implement various features of embodiments described in the present disclosure.

As used herein, the terms circuit, system, and component might describe a given unit of functionality that can be performed in accordance with one or more applications of the present application. As used herein, a component might be implemented utilizing any form of hardware, software, or a combination thereof. For example, one or more processors, controllers, ASICS, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as user device applications described herein), these software elements can be implemented to operate with a computing or processing component capable of carrying out the functionality described with respect thereto. One such example computing component is shown in FIG. 8. Various applications are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a vehicle (e.g., vehicle 150, vehicle 200), user device, self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability. In another example, a computing component might be found in components making up device 150, vehicle 200, platoon formation circuit 310, decision and control circuit 303, computing system 100, computing system 210, ECU 225, etc.

Computing component 800 might include, for example, one or more processors, controllers, control components, or other processing devices. This can include a processor, and any one or more of the components making up device 150 of FIG. 1, vehicle 200 of FIG. 2, computing system 210 of FIG. 2, and platoon formation system 300 of FIG. 3. Processor 804 might be implemented using a general-purpose or special-purpose processing engine such as, for example, a microprocessor, controller, or other control logic. The processor 804 might be specifically configured to execute one or more instructions for execution of logic of one or more circuits described herein, such as platoon formation circuit 310, decision and control circuit 303, and logic for control systems 240. Processor 804 may be configured to execute one or more instructions for performing one or more methods, such as the process described in FIG. 4 and the method described in FIG. 7.

Processor 804 may be connected to a bus 802. However, any communication medium can be used to facilitate interaction with other components of computing component 800 or to communicate externally. In applications, processor 804 may fetch, decode, and execute one or more instructions to control processes and operations for enabling vehicle servicing as described herein. For example, instructions can correspond to steps for performing one or more steps of the process described in FIG. 4 and the method described in FIG. 7.

Computing component 800 might also include one or more memory components, simply referred to herein as main memory 808. For example, random access memory (RAM) or other dynamic memory, might be used for storing information and instructions to be fetched, decoded, and executed by processor 804. Such instructions may include one or more instructions for execution of one or more logical circuits described herein. Instructions can include instructions 208 of FIG. 2, and instructions 309 of FIG. 3 as described herein, for example. Main memory 808 might also be used for storing temporary variables or other intermediate information during execution of instructions to be fetched, decoded, and executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative applications, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage unit 822 and interface 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 822, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport. Obstructions can include one or more potholes, cracks, tire markings, faded road markings, debris, objects, occlusion, road reflection, floodings, icy surfaces, oil leaks, uneven pavement, erosions, raveling and other potentially hazardous conditions on the road. Although roads are references herein, it is understood that the present disclosure is not limited to roads or to 1d or 2d traffic patterns.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof. While various applications of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various applications be implemented to perform the recited functionality in the same order, and with each of the steps shown, unless the context dictates otherwise.

Although the disclosed technology is described above in terms of various exemplary applications and implementations, it should be understood that the various features, aspects and functionality described in one or more of the individual applications are not limited in their applicability to the particular application with which they are described, but instead can be applied, alone or in various combinations, to one or more of the other applications of the disclosed technology, whether or not such applications are described and whether or not such features are presented as being a part of a described application. Thus, the breadth and scope of the technology disclosed herein should not be limited by any of the above-described exemplary applications.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various applications set forth herein are described in terms of exemplary block diagrams, flow charts and other illustrations. As will become apparent to one of ordinary skill in the art after reading this document, the illustrated applications and their various alternatives can be implemented without confinement to the illustrated examples. For example, block diagrams and their accompanying description should not be construed as mandating a particular architecture or configuration.

What is claimed is:

1. A computer implemented method for platoon formation, the method comprising:

determining a plurality of vehicles traveling to a destination, the determination based on platoon formation messages received from the plurality of vehicles;

determine, from the platoon formation messages, a subset of vehicles from the plurality of vehicles that have a latency capability at or below a teleoperated driving (ToD) threshold;

determining from the subset of vehicles a lead vehicle for a platoon, wherein the lead vehicle comprises a latency capability with a lowest latency of the subset of vehicles;

determining from the subset of vehicles a follow vehicle for the platoon, wherein the follow vehicle comprises a vehicular capability at or above a platoon following threshold for the vehicular capability;

forming the platoon between the lead vehicle and the follow vehicle;

upon forming the platoon, deactivating video streaming of the follow vehicle; and generating a platoon route for the platoon based on video data obtained by the lead vehicle.

2. The method of claim 1, wherein a platoon formation message of a vehicle comprises the latency capability and the vehicular capability of the vehicle.

3. The method of claim 1, wherein the vehicular capability comprises at least one of longitudinal stability, lateral stability, lateral deviation, communication, and driving performance of the follow vehicle.

4. The method of claim 1, wherein the ToD threshold is based on an overall latency permitted for the platoon.

5. The method of claim 1, wherein the platoon following threshold is based on at least one of the lead vehicle, follow vehicle, destination, road traveled on by the lead vehicle and the follow vehicle, time of day, day of week, traffic, road conditions, and environmental conditions.

6. The method of claim 1, wherein forming the platoon comprises one or more instructions for each vehicle in the platoon to execute to form the platoon.

7. The method of claim 1, wherein forming the platoon comprises linking a communication channel of the lead vehicle to a communication channel of the follow vehicle.

8. The method of claim 7, further comprising disassembling the platoon of vehicles by:

disconnecting communication channels of the lead vehicle from communication channels of the follow vehicle; and reactivating video streaming of the follow vehicle.

9. The method of claim 1, wherein the platoon route comprises a route for the platoon of vehicles to follow to reach the destination and the platoon route is sent to each vehicle in the platoon.

10. The method of claim 1, wherein generating the platoon route is further based on the vehicular capability of each vehicle in the platoon.

11. A computing system for platoon formation comprising:

one or more processors; and memory coupled to the one or more processors to store instructions, which when executed by the one or more processors, cause the one or more processors to perform operations, the operations comprising:

determining a plurality of vehicles traveling to a destination, the determination based on platoon formation messages received from the plurality of vehicles;

determine, from the platoon formation messages, a subset of vehicles from the plurality of vehicles that have a latency capability at or below a teleoperated driving (ToD) threshold;

determining from the subset of vehicles a lead vehicle for a platoon, wherein the lead vehicle comprises a latency capability with a lowest latency of the subset of vehicles;

determining from the subset of vehicles a follow vehicle for the platoon, wherein the follow vehicle comprises a vehicular capability at or above a platoon following threshold for the vehicular capability;

forming the platoon between the lead vehicle and the follow vehicle;

upon forming the platoon, deactivating video streaming of the follow vehicle; and generating a platoon route for the platoon based on video data obtained by the lead vehicle.

12. The computing system of claim 11, wherein a platoon formation message of a vehicle comprises the latency capability and the vehicular capability of the vehicle and wherein the vehicular capability comprises at least one of longitudinal stability, lateral stability, lateral deviation, communication, and driving performance of the follow vehicle.

13. The computing system of claim 11, wherein the ToD threshold is based on an overall latency permitted for the platoon.

14. The computing system of claim 11, wherein the platoon following threshold is based on at least one of the lead vehicle, follow vehicle, destination, road traveled on by the lead vehicle and the follow vehicle, time of day, day of week, traffic, road conditions, and environmental conditions.

15. The computing system of claim 11, wherein forming the platoon comprises one or more instructions for each vehicle in the platoon to execute to form the platoon.

16. The computing system of claim 11, wherein forming the platoon comprises linking a communication channel of the lead vehicle to a communication channel of the follow vehicle.

17. The computing system of claim 16, the operations further comprising disassembling the platoon of vehicles by:

disconnecting communication channels of the lead vehicle from communication channels of the follow vehicle; and reactivating video streaming of the follow vehicle.

18. The computing system of claim 11, wherein the platoon route comprises a route for the platoon of vehicles to follow to reach the destination, the platoon route is sent to each vehicle in the platoon, and wherein generating the platoon route is further based on the vehicular capability of each vehicle in the platoon.

19. A non-transitory machine-readable medium having instructions stored therein, which when executed by a processor, cause the processor to perform operations, the operations comprising:

determining a plurality of vehicles traveling to a destination, the determination based on platoon formation messages received from the plurality of vehicles;

determine, from the platoon formation messages, a subset of vehicles from the plurality of vehicles that have a latency capability at or below a teleoperated driving (ToD) threshold;

determining from the subset of vehicles a lead vehicle for a platoon, wherein the lead vehicle comprises a latency capability with a lowest latency of the subset of vehicles;

determining from the subset of vehicles a follow vehicle for the platoon, wherein the follow vehicle comprises a vehicular capability at or above a platoon following threshold for the vehicular capability;

forming the platoon between the lead and follow vehicles;

upon forming the platoon, deactivating video streaming of the follow vehicle and linking communication channels of the lead vehicle to communication channels of the follow vehicle; and generating a platoon route for the platoon based on video data obtained by the lead vehicle.

20. The non-transitory machine-readable medium of claim 19, the operations further comprising disassembling the platoon of vehicles by:

disconnecting communication channels of the lead vehicle from communication channels of the follow vehicle; and reactivating video streaming of the follow vehicle.

* * * * *